(12) United States Patent
Akiyama et al.

(10) Patent No.: US 7,375,145 B2
(45) Date of Patent: May 20, 2008

(54) INKJET INK

(75) Inventors: Ryozo Akiyama, Mishima (JP); Toru Ushirogouchi, Yokohama (JP); Kazuhiko Ohtsu, Mishima (JP); Mitsuru Ishibashi, Yokohama (JP); Hiroshi Kiyomoto, Hiratsuka (JP); Yukiko Kawakami, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 204 days.

(21) Appl. No.: 10/969,204

(22) Filed: Oct. 20, 2004

(65) Prior Publication Data

US 2005/0113476 A1 May 26, 2005

(30) Foreign Application Priority Data

Oct. 28, 2003 (JP) ............................. 2003-367804
Aug. 31, 2004 (JP) ............................. 2004-252466

(51) Int. Cl.
C09D 11/10 (2006.01)
C08F 2/46 (2006.01)

(52) U.S. Cl. ...................... 522/168; 522/181; 522/78; 522/74; 522/75

(58) Field of Classification Search ................. 522/31, 522/75, 81, 181, 168, 78, 74
See application file for complete search history.

(56) References Cited

U.S. PATENT DOCUMENTS

| 3,150,166 | A | | 9/1964 | Pohlemann et al. |
| 5,641,346 | A | | 6/1997 | Mantell et al. |
| 5,889,084 | A | | 3/1999 | Roth |
| 6,495,636 | B2 | * | 12/2002 | Sugiyama et al. ....... 525/326.3 |
| 6,866,376 | B2 | * | 3/2005 | Maeda et al. ................ 347/100 |
| 6,959,986 | B2 | * | 11/2005 | Ushirogouchi et al. ..... 347/100 |
| 2001/0036591 | A1 | | 11/2001 | Schulz et al. |
| 2003/0135059 | A1 | | 7/2003 | Matsumura et al. |
| 2003/0231234 | A1 | | 12/2003 | Ushirogouchi et al. |
| 2004/0166253 | A1 | | 8/2004 | Sasa |
| 2005/0113483 | A1 | | 5/2005 | Takabayashi |

FOREIGN PATENT DOCUMENTS

| EP | 1 070 592 A1 | 1/2001 |
| EP | 1 167 043 A1 | 1/2002 |
| EP | 1 243 629 A1 | 9/2002 |
| EP | 1 321 497 A1 | 6/2003 |
| EP | 1 357 159 A2 | 10/2003 |
| JP | 09-183928 | 7/1997 |
| JP | 11-322900 | 11/1999 |
| JP | 2000-026444 | 1/2000 |
| JP | 2001-220526 | 8/2001 |
| JP | 2002-302507 | 10/2002 |
| JP | 2003-119414 | 4/2003 |
| JP | 2005-139275 | 6/2005 |
| WO | WO 93/17867 | 9/1993 |
| WO | WO 03/040242 A2 | 5/2003 |

OTHER PUBLICATIONS

Patent Abstracts of Japan for JP 08143806, Jun. 1996.
Patent Abstracts of Japan for JP 2001181385, Jul. 2001.
European Search Report for EP 04 02 5172, Mar. 2005.
European Search Report for EP 0500 3782, Oct. 2005.
European Search Report for EP 0500 3781, Nov. 2005.
European Search Report, EP 03009283, Oct. 2003.
Patent Abstracts of Japan for JP 10 025262, Jan. 1998.
Patent Abstracts of Japan for JP 07076544, Mar. 1995.
Patent Abstracts of Japan for JP 07069954, Mar. 1995.
Patent Abstracts of Japan for JP 05 287696, Nov. 1993.
Communication (including translation) from Japanese Patent Office regarding related application.
Communication (with translation) from Japanese Patent Office re: related application.

* cited by examiner

*Primary Examiner*—Susan W Berman
(74) *Attorney, Agent, or Firm*—Harness, Dickey & Pierce, P.L.C.

(57) ABSTRACT

There is provided an inkjet ink comprising a photo-acid generating agent which is capable of generating an acid as it is irradiated with light, a color component, and an acid-polymerizable compound which can be polymerized in the presence of an acid, wherein at least 40% of the acid-polymerizable solvent is a vinyl ether compound represented by the following general formula (1):

$$R^{13}\text{—}R^{14}\text{—}(R^{13})_p \qquad (1)$$

(Wherein $R^{13}$(s) is a group selected from the group consisting of a vinyl ether group, a group having a vinyl ether skeleton, an alkoxy group, substituted hydroxyl group and hydroxyl group wherein at least one of $R^{13}$(s) is vinyl ether group or a group having a vinyl ether skeleton, $R^{14}$ is a group comprising a substituted or unsubstituted cyclic skeleton and having a valence of (p+1), and p is a positive integer including zero).

11 Claims, 1 Drawing Sheet

--Prior Art--

--Prior Art--

INKJET INK

CROSS-REFERENCE TO RELATED APPLICATIONS

This application is based upon and claims the benefit of priority from prior Japanese Patent Applications No. 2003-367804, filed Oct. 28, 2003; and No. 2004-252466, filed Aug. 31, 2004, the entire contents of both of which are incorporated herein by reference.

BACKGROUND OF THE INVENTION

1. Field of the Invention

This invention relates to an inkjet ink.

2. Description of the Related Art

In a situation where a fairly large number of copies of printed matter are required such as in the cases of local advertisement bill, enterprise handout and a postern of large scale, a printing machine utilizing a form plate has been conventionally employed for meeting such requirements. In recent years however, an on-demand printer which is capable of quickly coping with the diversification of needs and of minimizing stocks has been increasingly utilized in place of the aforementioned conventional printing machine. As for such an on-demand printer, an electrophotographic printer where a toner or a liquid toner is employed as well as an inkjet printer which is capable of achieving high-velocity and high-quality printing are expected to be useful.

As in the case of the printing machine utilizing a form plate, the on-demand printer employs a solvent type ink or a solvent type liquid toner both containing a pigment and an organic solvent. This technique of employing a solvent type ink or a solvent type liquid toner is however accompanied with the problem that the organic solvent volatilizes to such an extent that cannot be disregarded when the printing is repeated a certain number of times. Therefore, when this technique is employed, a problem of environmental contamination due to this volatilized organic solvent will be raised, thus necessitating the provision of an exhaust gas processing installation or a solvent recovery system.

On the other hand, in the case of the inkjet printer, since a solvent type ink can be handled in a closed system until the ink is discharged onto the surface of printing matter, it is possible, through the provision of suitable countermeasure for the exhaustion of solvent, to alleviate the aforementioned problem of environmental contamination. However, in different from the ink to be employed in the printing machine utilizing a form plate, the ink to be employed in the inkjet printer is required to have a suitable degree of fluidity for the delivery of ink. Therefore, the ink to be employed in the inkjet printer is required to be sufficiently high in the concentration of solvent, so that even with this technique, it is essentially difficult to overcome the problem of environmental contamination associated with the employment of the organic solvent.

Further, in the case of using a solvent type ink, the quality of printing is greatly influenced by the features of surface of printing matter. For example, if the surface of printing mater is permeable, bleeding is more likely to occur, and if the surface of printing mater is impermeable, it will become difficult to fix printed images. Moreover, since it will take a certain period of time in order to dry completely an ink layer that has been formed on the surface of printing matter, when an image is formed relatively thick on a large surface of printing matter, the image is more likely to collapse due to the fluidity of ink. Moreover, when the solvent type ink is employed, there is high possibility that the printed surface is deteriorated in the drying process of the ink layer. Thus, according to the aforementioned conventional techniques, it is not necessarily easy to obtain a printer matter with high qualities.

Incidentally, a photosensitive ink and a printer system employing the photosensitive ink are now taken notice of as a technique for coping with the aforementioned problem of solvent. The photosensitive ink to be employed this case typically comprises a radical polymeric monomer, a photo-polymerization initiator and a pigment. Once this photosensitive ink is delivered onto a printing surface, it can be quickly photo-cured.

According to this technique, since the ink layer that has been formed on a printing surface can be non-fluidized by the irradiation of light, it is possible to obtain a printed matter which is relatively excellent in quality. However, this photosensitive ink includes a large amount of carcinogenic radical-generating agents such as a radical generating agent and still more, a volatile acrylic acid derivative to be employed as a radical polymeric monomer is highly stimulating to skin and badly smelling. Namely, it is necessary to take care in handling a photosensitive ink of this kind. Further, the radical polymerization is considerably obstructed by the presence of oxygen in air atmosphere and additionally, the light for exposure will be lost due to the absorption of light by the pigment included in the ink. As a result, underexposure may occur at a deep region of ink layer, so that the conventional radical polymeric ink is poor in sensitivity to light. Accordingly, in order to obtain a printed matter of high quality by using this conventional technique, it would become necessary to construct a large scale exposure system.

There has been proposed, as an ink which is relatively free from the influence of oxygen, a photosensitive ink which is cation photo-polymerizable. However, since the conventional ink of this type contains a solvent, the problem of the release of the solvent into environment cannot be overcome. Moreover, a cured layer is more likely to be further hardened, thus giving rise to the problem of clogging of the delivery head since this hardened layer is insoluble. Furthermore, there has been proposed a cation-cure type photosensitive composition which is adapted for inkjet delivery and can be employed for the coating of CD-ROM. The composition which has been found capable of performing the inkjet delivery mainly comprises vinyl ether and bisphenol A type epoxy, and hence there is still a serious problem associated with the release of these compounds to the environment.

There has been also proposed an inkjet ink having a specific composition including a cation-curable monomer. Since this ink also contains, as an essential component, a specific kind of vinyl ether compound which is high in volatility, there is the same problem as described above. Further, ordinary vinyl ether compounds are accompanied with the problem that when it is employed in combination with pigment, they become poor in polymerizability.

Additionally, there has been disclosed a photosensitive inkjet ink comprising a polyvalent vinyl ether compound and an alicyclic epoxy compound. The vinyl ethers disclosed are accompanied with various problems that they are poor in polymerizability, that the skeleton of bisphenol A exhibits its specific carcinogenic property, and that since the vinyl ethers are employed in combination with an alicyclic epoxy which is high in solubility and dark-reactivity, they are poor in shelf life and a printed matter to be obtained is not sufficiently resistive to a solvent.

In particular, when the printing surface is constituted by an absorptive medium, there will be raised the problem that the conventional acrylic photo-curable inkjet ink cannot be easily cured in the interior of the absorptive printing surface.

Incidentally, the conventional photo-cation-cure type inkjet ink is accompanied with the problem that the viscosity thereof can be greatly fluctuated. The reason for this can be attributed to the fact that once an acid generates due to changes with time of ink, the acid cannot be easily deactivated, thus giving rise to a great magnitude of dark reaction of ink. In the case of inkjet ink, when the viscosity thereof is caused to change, it will lead to the disturbance of the ejecting shape of ink, to poor reproducibility of printing, and in the worst case, to a critical condition such as defective delivery of ink and clogging of ink. Therefore, this problem is very serious.

BRIEF SUMMARY OF THE INVENTION

Therefore, one of the objects of the present invention is to provide an inkjet ink wherein the employment of an organic solvent is no longer required, and the provision of an exposure system of large scale for obtaining printed matters of high quality is no longer required. Another object of the present invention is to provide an inkjet ink which is capable of overcoming the problems such as poor cation polymerizing reaction and solvent resistance which are particularly accompanied with the conventional photosensitive inkjet ink containing, as a main component, a vinyl ether compound.

According to one aspect of the present invention, there is provided an inkjet ink comprising:

a photo-acid generating agent which is capable of generating an acid as it is irradiated with light;

a color component; and an acid-polymerizable compound which can be polymerized in the presence of an acid;

wherein the acid-polymerizable solvent comprises a compound represented by the following general formula (1):

  (1)

(Wherein $R^{13}(s)$ is a group selected from the group consisting of a vinyl ether group, a group having a vinyl ether skeleton, an alkoxy group, substituted hydroxyl group and hydroxyl group wherein at least one of $R^{13}(s)$ is vinyl ether group or a group having a vinyl ether skeleton; $R^{14}$ is a group comprising a substituted or unsubstituted cyclic skeleton and having a valence of (p+1); and p is a positive integer including zero).

According to another aspect of the present invention, there is provided an inkjet ink comprising:

a photo-acid generating agent which is capable of generating an acid as it is irradiated with light;

a color component; and an acid-polymerizable compound which can be polymerized in the presence of an acid;

wherein at least 40% of the acid-polymerizable solvent is a compound represented by the following general formula (1), and the viscosity of the ink is not higher than 12 mPa·sec at the ordinary temperature:

  (1)

(Wherein $R^{13}(s)$ is a group selected from the group consisting of a vinyl ether group, a group having a vinyl ether skeleton, an alkoxy group, substituted hydroxyl group and hydroxyl group wherein at least one of $R^{13}(s)$ is vinyl ether group or a group having a vinyl ether skeleton; $R^{14}$ is a group comprising a substituted or unsubstituted cyclic skeleton and having a valence of (p+1); and p is a positive integer including zero).

According to further aspect of the present invention, there is provided an inkjet ink comprising:

a photo-acid generating agent which is capable of generating an acid as it is irradiated with light;

a color component; and an acid-polymerizable compound which can be polymerized in the presence of an acid;

wherein at least 40% of the acid-polymerizable solvent is a compound represented by the following general formula (1), and the ink further comprising an epoxy compound and/or oxetane compound both having a solubility parameter of $MPa^{1/2}$ or more:

  (1)

(Wherein $R^{13}(s)$ is a group selected from the group consisting of a vinyl ether group, a group having a vinyl ether skeleton, an alkoxy group, substituted hydroxyl group and hydroxyl group wherein at least one of $R^{13}(s)$ is vinyl ether group or a group having a vinyl ether skeleton; $R^{14}$ is a group comprising a substituted or unsubstituted cyclic skeleton and having a valence of (p+1); and p is a positive integer including zero).

According to further aspect of the present invention, there is provided an inkjet ink comprising:

a photo-acid generating agent which is capable of generating an acid as it is irradiated with light;

a color component; and an acid-polymerizable compound which can be polymerized in the presence of an acid;

wherein at least 40% of the acid-polymerizable solvent is a compound represented by the following general formula (1), and the ink further comprising an epoxy compound and/or oxetane compound both having a viscosity exceeding 500 mPa·sec at the ordinary temperature:

  (1)

(Wherein $R^{13}(s)$ is a group selected from the group consisting of a vinyl ether group, a group having a vinyl ether skeleton, an alkoxy group, substituted hydroxyl group and hydroxyl group wherein at least one of $R^{13}(s)$ is vinyl ether group or a group having a vinyl ether skeleton; $R^{14}$ is a group comprising a substituted or unsubstituted cyclic skeleton and having a valence of (p+1); and p is a positive integer including zero).

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Figure 1:
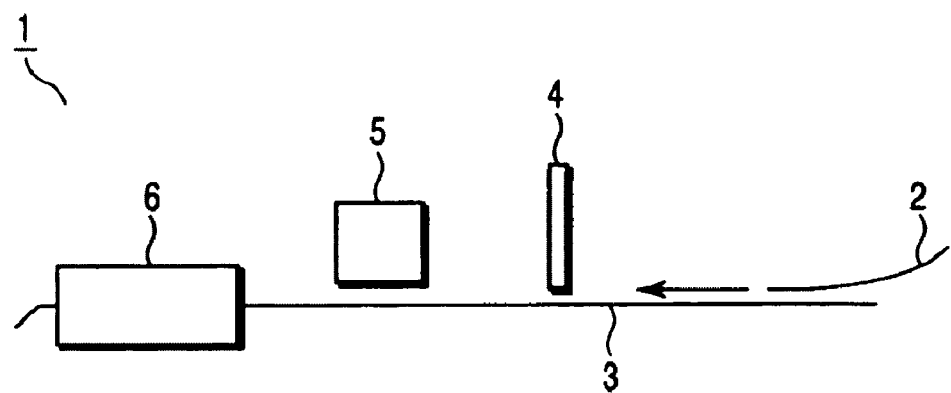
FIG. 1 is a schematic view of a recording apparatus making it possible to employ an inkjet ink according to one embodiment of the present invention.

Next, various embodiments of the present invention will be explained as follows.

The inkjet ink according to one embodiment of the present invention comprises a photo-acid generating agent which is capable of generating an acid as it is irradiated with light, a color component, and an acid-polymerizable compound which can be polymerized in the presence of an acid. The inkjet ink according to this embodiment is formed of a chemical amplification type photosensitive composition. The term "inkjet ink" herein means an ink which is fluid at the ordinary temperature, more specifically an ink having a viscosity of 50 mPa·sec or less, more preferably 30 mPa·sec or less at a temperature of 25° C. Alternatively, the inkjet ink may be an ink having a viscosity of 12 mPa·sec or less at a temperature ranging from the ordinary temperature to about 50° C., i.e. within the temperature controlling range of an inkjet head.

When this inkjet ink is irradiated with light, an acid generates from the photo-acid generating agent, and then, this acid acts as a catalyst for the crosslinking reaction of the polymeric compound and at the same time, diffuses inside the ink layer. Therefore, in this ink layer after the exposure thereof, the crosslinking reaction using this acid as a catalyst proceeds. This crosslinking reaction can be accelerated by applying heat to the ink layer. In different from the radical polymerization, this crosslinking reaction would not be obstructed by the presence of oxygen. As a result, a plurality of crosslinking reactions occur using only one photon, thereby making it possible to realize a high sensitivity. Moreover, the crosslinking reaction can take place quickly even in a deep portion of the ink layer and in the interior of the medium. Therefore, as compared with the case of radical polymerization system, the ink layer to be obtained in this manner would become far more excellent in adhesion.

Next, the components to be included in the inkjet ink according to the embodiments of the present invention will be explained in detail, respectively.

(Photo-acid Generating Agent)

As for the examples of photo-acid generating agent which are capable of generating acid as they are irradiated with light, it is possible to employ onium salt, diazonium salt, quinone diazide compounds, organic halide compounds, aromatic sulfonate compounds, bisulfone compounds, sulfonyl compounds, sulfonate compounds, sulfonium compounds, sulfamide compounds, iodonium compounds, sulfonyl diazomethane compounds and mixtures of these compounds.

Specific examples of the aforementioned compounds include triphenylsulfonium triflate, diphenyliodonium triflate, 2,3,4,4-tetrahydroxybenzophenone-4-naphthoquinone diazide sulfonate, 4-N-phenylamino-2-methoxyphenyl diazonium sulfate, 4-N-phenylamino-2-methoxyphenyldiazonium-p-ethylphenyl sulfate, 4-N-phenylamino-2-methoxyphenyldiazonium-2-naphthyl sulfate, 4-N-phenylamino-2-methoxyphenyldiazonium-phenyl sulfate, 2,5-diethoxy-4-N-4'-methoxyphenylcarbonylphenyldiazonium-3-carboxy-4-hydroxyphenyl sulfate, 2-methoxy-4-N-phenylphenyldiazonium-3-carboxy-4-hydroxyphenyl sulfate, diphenylsulfonyl methane, diphenylsulfonyl diazomethane, diphenyl disulfone, α-methylbenzoin tosylate, pyrogallo trimesylate, benzoin tosylate, MPI-103 (CAS.NO. [87709-41-9]; Midori Kagaku Co., Ltd.), BDS-105 (CAS.NO.[145612-66-4]; Midori Kagaku Co., Ltd.), NDS-103 (CAS.NO.[110098-97-0]; Midori Kagaku Co., Ltd.), MDS-203 (CAS.NO.[127855-15-5]; Midori Kagaku Co., Ltd.), Pyrogallo tritosylate (CAS.NO.[20032-64-8]; Midori Kagaku Co., Ltd.), DTS-102 (CAS.NO.[75482-18-7]; Midori Kagaku Co., Ltd.), DTS-103 (CAS.NO.[71449-78-0]; Midori Kagaku Co., Ltd.), MDS-103 (CAS.NO.[127279-74-7]; Midori Kagaku Co., Ltd.), MDS-105 (CAS.NO.[116808-67-4]; Midori Kagaku Co., Ltd.), MDS-205 (CAS.NO.[81416-37-7]; Midori Kagaku Co., Ltd.), BMS-105 (CAS.NO.[149934-68-9]; Midori Kagaku Co., Ltd.), TMS-105 (CAS.NO.[127820-38-6]; Midori Kagaku Co., Ltd.), NB-101 (CAS.NO.[20444-09-1]; Midori Kagaku Co., Ltd.), NB-201 (CAS.NO.[4450-68-4]; Midori Kagaku Co., Ltd.), DNB-101 (CAS.NO.[114719-51-6]; Midori Kagaku Co., Ltd.), DNB-102 (CAS.NO.[131509-55-2]; Midori Kagaku Co., Ltd.), DNB-103 (CAS.NO.[132898-35-2]; Midori Kagaku Co., Ltd.), DNB-104 (CAS.NO.[132898-36-3]; Midori Kagaku Co., Ltd.), DNB-105 (CAS.NO.[132898-37-4]; Midori Kagaku Co., Ltd.), DAM-101 (CAS.NO.[1886-74-4]; Midori Kagaku Co., Ltd.), DAM-102 (CAS.NO.[28343-24-0]; Midori Kagaku Co., Ltd.), DAM-103 (CAS.NO.[14159-45-6]; Midori Kagaku Co., Ltd.), DAM-104 (CAS.NO.[130290-80-1] and CAS.NO.[130290-82-3]; Midori Kagaku Co., Ltd.), DAM-201 (CAS.NO.[28322-50-1]; Midori Kagaku Co., Ltd.), CMS-105 (Midori Kagaku Co., Ltd.), DAM-301 (CAS.NO.[138529-81-4]; Midori Kagaku Co., Ltd.), SI-105 (CAS.NO.[34694-40-7]; Midori Kagaku Co., Ltd.), NDI-105 (CAS.NO.[133710-62-0]; Midori Kagaku Co., Ltd.); EPI-105 (CAS.NO.[135133-12-9]; Midori Kagaku Co., Ltd.); and UVACURE1591(DAICEL UCB Co., Ltd.).

Further, as the photo-acid generating agent, the following compounds can be also employed.

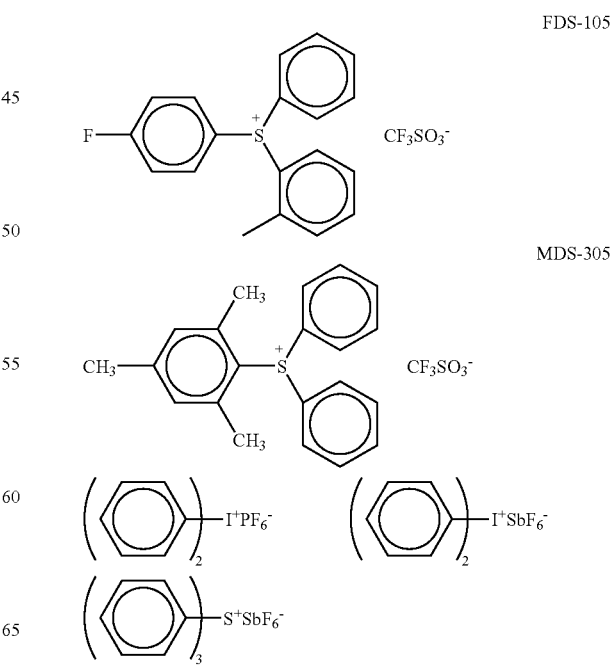

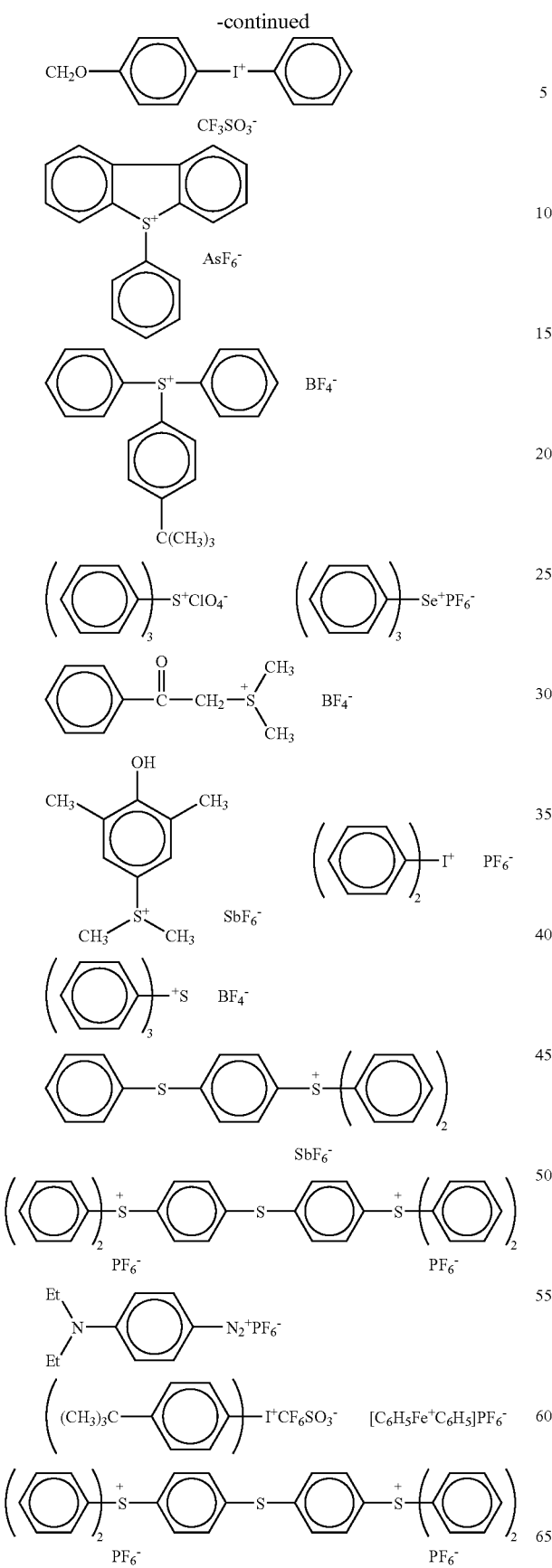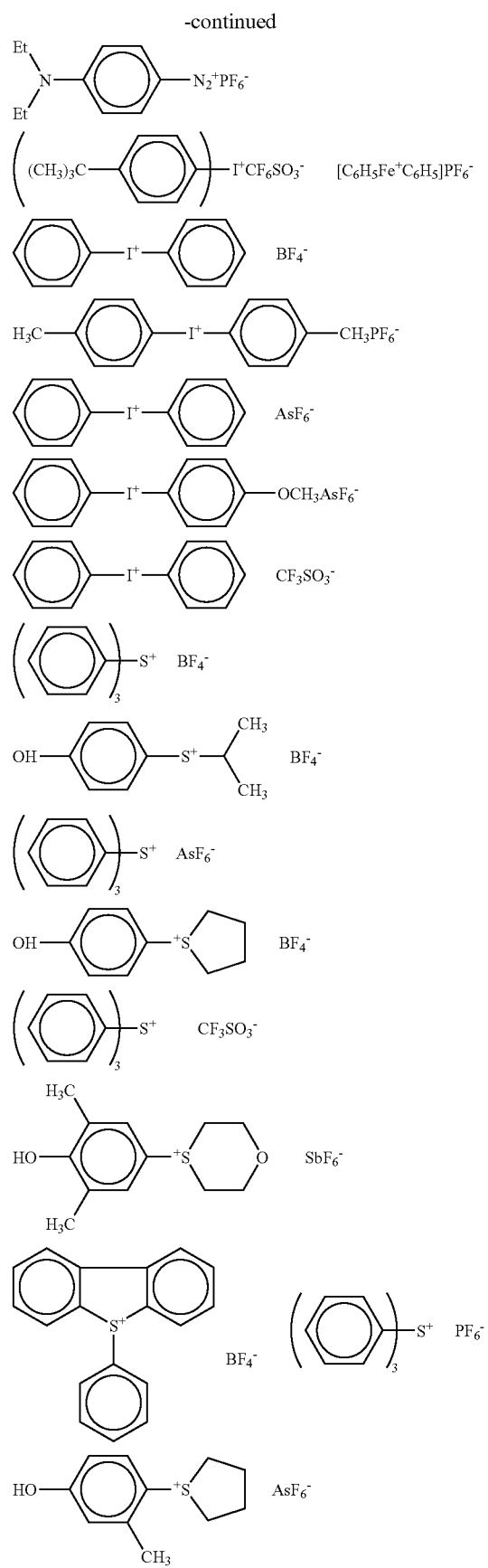

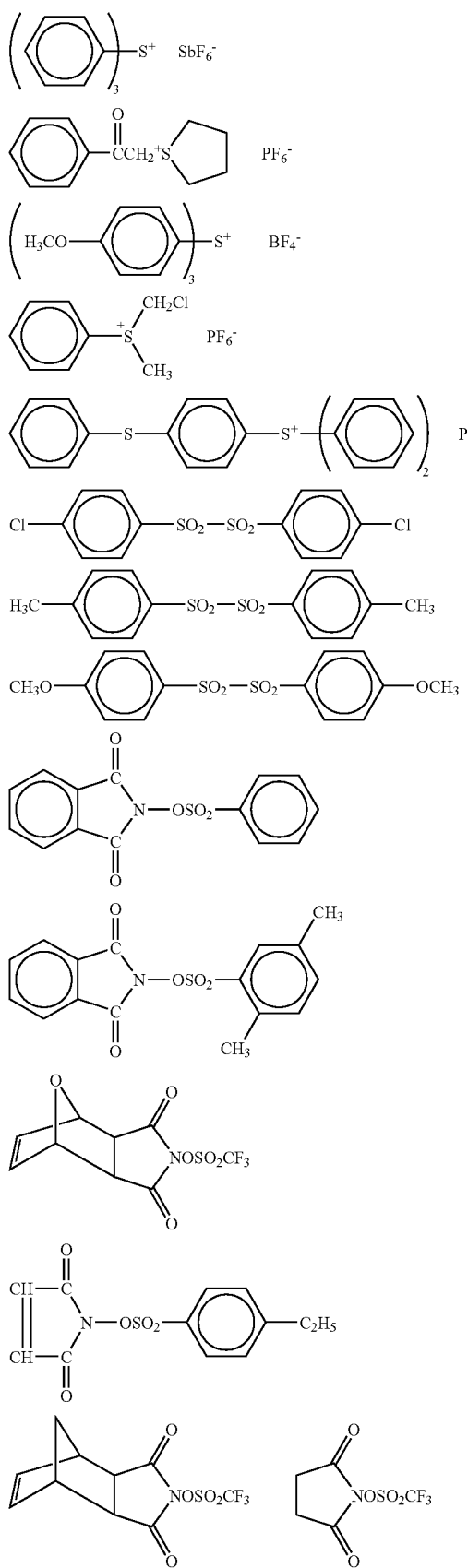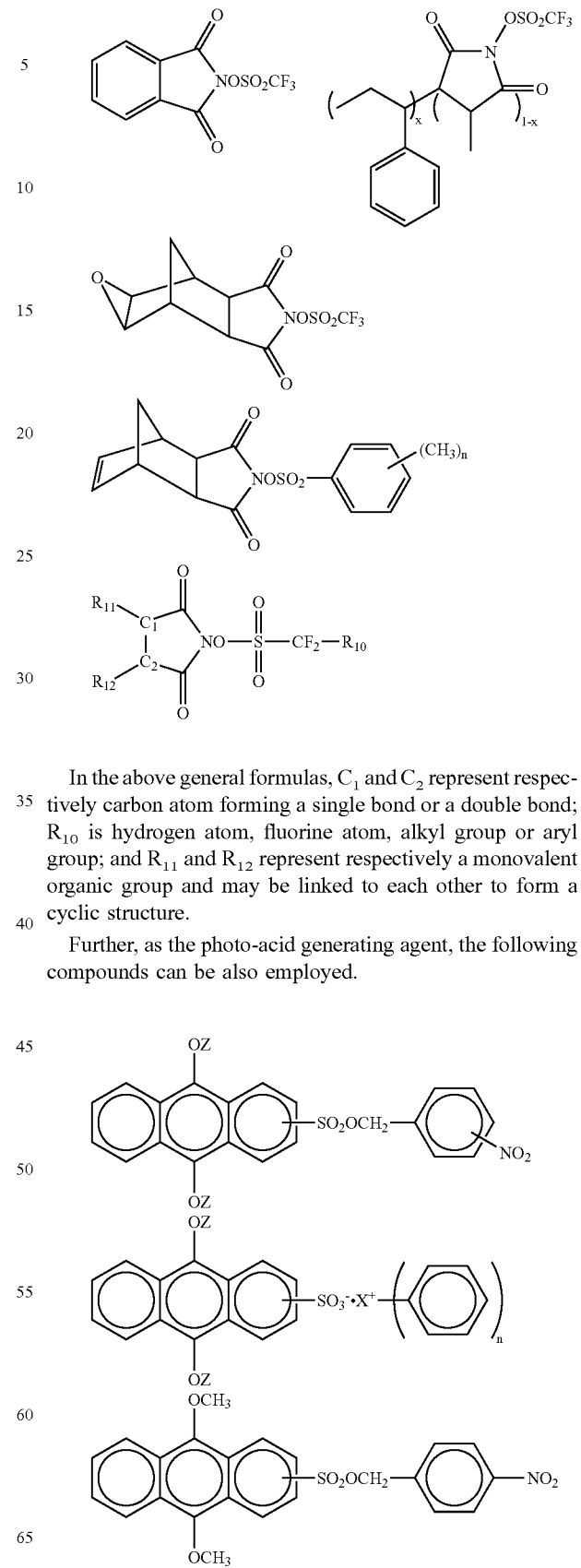

In the above general formulas, $C_1$ and $C_2$ represent respectively carbon atom forming a single bond or a double bond; $R_{10}$ is hydrogen atom, fluorine atom, alkyl group or aryl group; and $R_{11}$ and $R_{12}$ represent respectively a monovalent organic group and may be linked to each other to form a cyclic structure.

Further, as the photo-acid generating agent, the following compounds can be also employed.

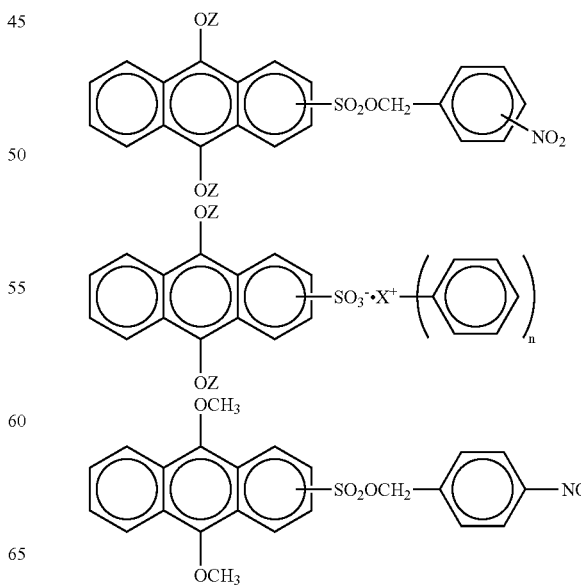

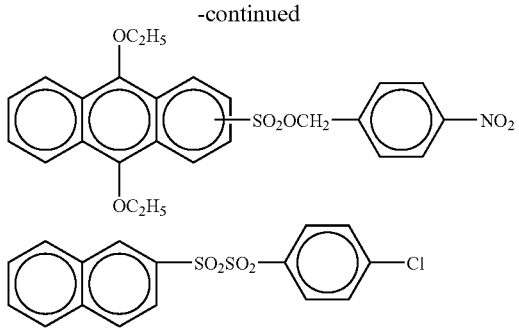

(In the above general formulas, Z is alkyl group.)

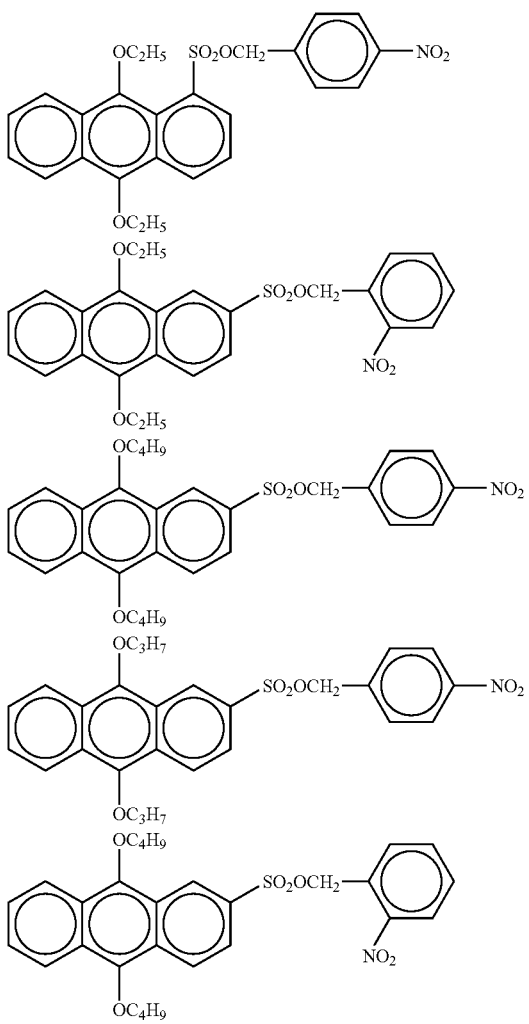

Among these compounds, preferable examples of the photo-acid generating agents are onium salts. Examples of onium salts useful in this case are diazonium salts, phosphonium salts and sulfonium salts having, as a counter ion, fluoroboric acid anion, hexafluoroantimonic acid anion, hexafluoroarsenic acid anion, trifluoromethane sulfonate anion, paratoluene sulfonate anion or paranitrotoluene sulfonate anion. In particular, it is especially preferable that the photo-acid generating agent comprises onium salts or triazine halide compounds represented by the following general formulas (4) and (5). These photo-acid generating agents are advantageous in terms of both sensitivity and stability.

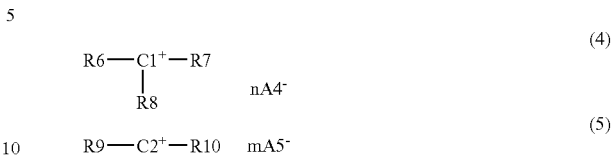

In this general formula, R6, R7, R8, R9 and R10 individually represents either aromatic group or functional group having a chalcogenide atom and an aromatic group; C1 and C2 individually represents a chalcogenide atom; A4 and A5 individually represents anion species selected from the group consisting of $PF_6^-$, $SbF_6^-$, $BF_4^-$, $AsF_6^-$, $CF_3SO_3^-$, $C_4F_9SO_3^-$ and $CH_3SO_3^-$; and m and n individually represents an integer. Incidentally, the term "chalcogenide atom" means a chalcogen atom and other atoms which are more positive than the chalcogen atoms. Further, "chalcogen atom" means to include sulfur, selenium, tellurium, polonium and iodine atoms.

The onium salts represented by the aforementioned general formulas (4) and (5) are high in curing reactivity and excellent in stability at the ordinary temperature. Therefore, the onium salts are capable of suppressing the curing of the aforementioned inkjet ink under the conditions where light is not irradiated thereto.

If the compounds represented by the aforementioned general formulas (4) and (5) are to be employed as a photo-acid generating agent, the aforementioned chalcogenide atom should preferably be selected from sulfur atom and iodine atom in view of securing the thermal stability of the photo-acid generating agent and the stability thereof to water. In this case, the anion species should preferably be formed of a non-organic acid, in particular, formed of $PF_6^-$ in view of securing suitable acidity and thermal stability. Further, it is especially preferable to employ hexafluorophosphate compounds having a phenylsulfonium skeleton in view of concurrently improving the photosensitivity of the photo-acid generating agent.

The photo-acid generating agent may further contain, if required, a sensitizing dye. Examples of such a sensitizing dye include acridine compounds, benzofuravins, perylene, anthracene and laser dyes.

When quinone diazide compounds are to be employed as a photo-acid generating agent, salts thereof such as naphthoquinone diazide sulfonyl chloride or naphthoquinone diazide sulfonic acid may be employed.

Organic halide means a compound which is capable of forming hydroacid halide, specific examples thereof being set forth for example in U.S. Pat. Nos. 3,515,552; 3,536,489; and 3,779,778; and in German Patent Laid-Open Publication No. 2243621. Specifically, U.S. Pat. No. 3,515,552 describes carbon tetrabromide, tetra(bromomethyl) methane, tetrabromoethylene, 1,2,3,4-tetrabromobutane, trichloroethoxy ethanol, p-iodophenol, p-bromophenol, p-iodobiphenyl, 2,6-dibromophenol, 1-bromo-2-naphthol, p-bromoaniline, hexachloro-p-xylene, trichloroacetoanilide, p-bromodimethyl aniline, tetrachlorotetrahydronaphthalene, α,α'-dibromoxylene, α,α,α',α'-tetrabromoxylene, hexabromoethane, 1-chloroanthraquinone, ω,ω,ω-tribromoquinalizine, hexabromocyclohexane, 9-bromofluorene, bis(pentachloro) cyclopentadiphenyl, polyvinylidene chloride and 2,4,6-trichlorophenoxyethyl vinylether. U.S. Pat. No. 3,779, 778 describes hexabromoethane, α,α,α-trichloroacetophenone, tribromotrichloroethane and halomethyl-S-triazine. Among them, halomethyl-S-triazine such as 2,4-bis(trichloromethyl)-6-methyl-S-triazine and 2,4,6-tris(trichloromethyl)-S-triazine are preferable for use. More preferable examples of the organic halide compound include those which are substituted by vinylhalomethyl-S-triazine, which is disclosed in U.S. Pat. No. 3,987,037. This vinylhalomethyl-S-triazine compound is a photo-decomposable S-triazine having at least one trihalomethyl group and a group which is conjugated through at least one ethylenically unsaturated bond with triazine ring. This vinylhalomethyl-S-triazine compound can be represented by the following formula (A).

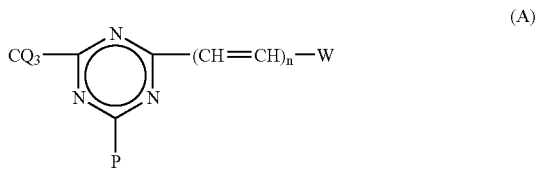

Wherein Q represents bromine atom or chlorine atom; P is —CQ$_3$, —NH$_2$, —NHR, —NR$_2$ or —OR; R is phenyl or lower alkyl having not more than 6 carbon atoms; n is an integer ranging from 1 to 3; and W is an aromatic ring, a heterocycle or a group represented by the following general formula (B):

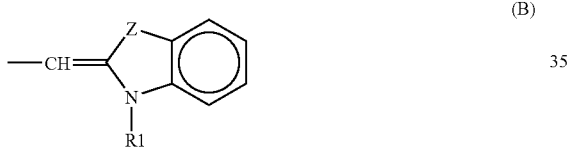

Wherein Z is oxygen atom or sulfur atom; and R1 is lower alkyl group or phenyl group.

At least one hydrogen atom in the aromatic ring or heterocycle represented by W in the above general formula (A) may be further substituted. In this case, examples of the substituent group include, for example, chlorine atom, bromine atom, phenyl group, lower alkyl group having not more than 6 carbon atoms, nitro group, phenoxy group, alkoxy group, acetoxy group, acetyl group, amino group and alkylamino group. As for specific examples of vinylhalomethyl-S-triazine compound, they include the following groups.

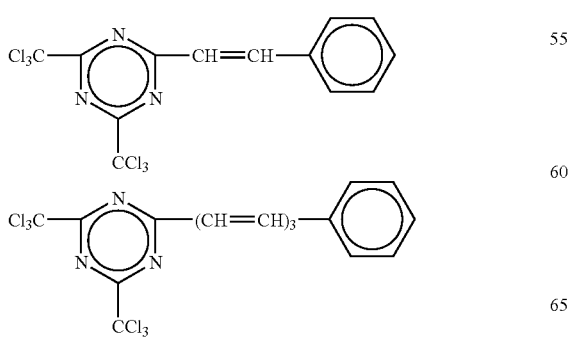

-continued

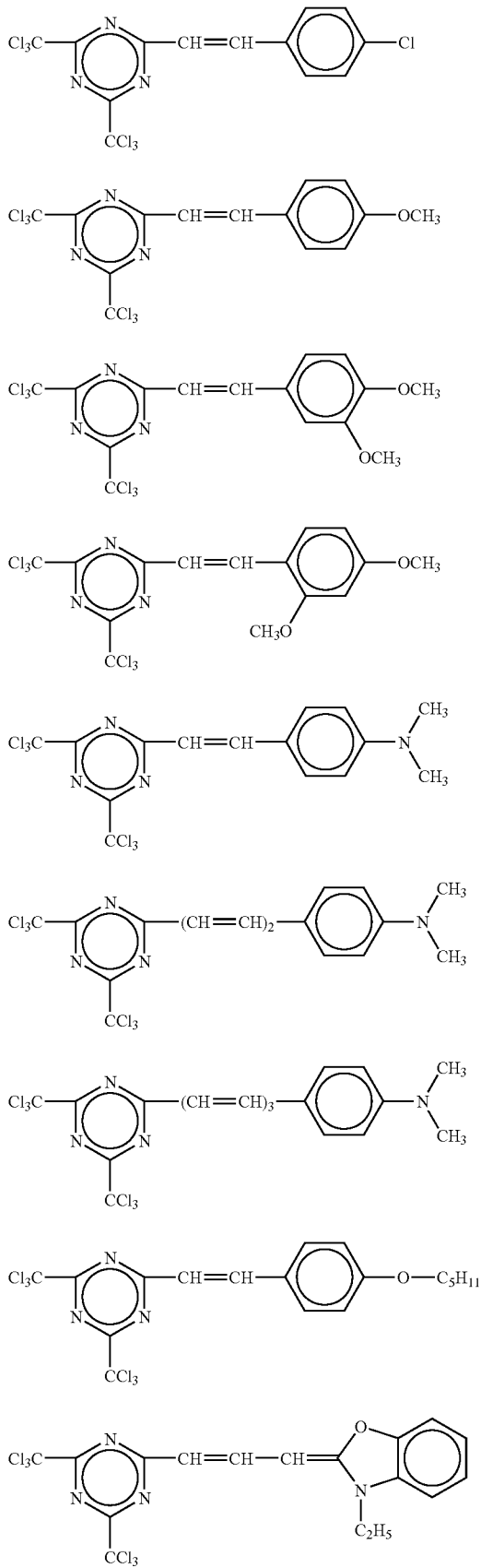

-continued

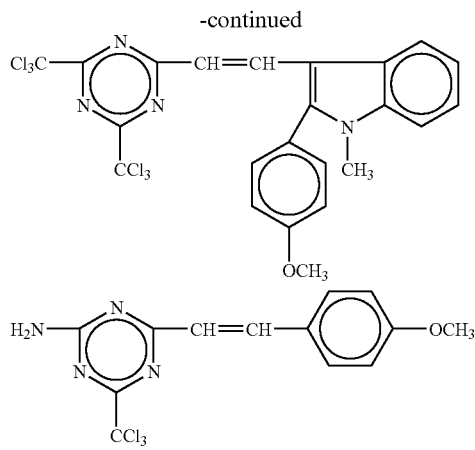

In addition to the aforementioned compounds, it is also possible to suitably employ, as a photo-acid generating agent, a compound having triazine ring having trihalomethane introduced into the skeleton thereof. If this triazine ring is provided with four or more conjugated double bonds, the photosensitive wavelength of the photo-acid generating agent would be shifted to the longer wavelength side. Therefore, if an ordinary high-pressure mercury lamp is to be employed as a light source, the employment of such a compound would be preferable. Specific examples of such a compound include triazine having naphthalene substituent group, and condensed triazine compounds.

Further, it is also possible to suitably employ acid esters having photodissociating property as a photo-acid generating agent. Specific examples of such esters include orthonitrobenzyl ester of alumi silanol.

The mixing ratio of the photo-acid generating agent in the inkjet ink may be suitably selected depending on the acid generating efficiency of the photo-acid generating agent to be employed as well as on the quantity of the color component. For example, when the concentration of the pigment in the inkjet ink is about 5% by weight, the mixing ratio of the photo-acid generating agent may be confined generally within the range of 1 to 10 parts by weight, more preferably 2 to 8 parts by weight, most preferably 4 to 8 parts by weight per 100 parts by weight of a compound which is polymerizable in the presence of an acid and included in the inkjet ink. Especially when the concentration of the pigment in the inkjet ink is confined within this more preferable range, the storage stability of the ink can be enhanced and at the same time, the corrosion of the piping or head member of recording apparatus can be minimized. If the mixing ratio of the photo-acid generating agent is less than 1 part by weight per 100 parts by weight of the acid-polymerizable compound, the sensitivity of the inkjet ink would be deteriorated. On the other hand, if the mixing ratio of the photo-acid generating agent exceeds 10 parts by weight, increase in viscosity with time of the ink would be intensified thereby deteriorating the coating properties of the ink and lowering the hardness of the ink film that has been photo-cured. Additionally, the corrosion of the piping or head member of recording apparatus may occur.

(Color Component)

As for the color component to be employed in the present invention, it is possible to employ pigment and/or dye. However, since an acid is employed in the mechanism in the case of the inkjet ink according to the embodiments of the present invention, it is more preferable to employ pigment rather than dye which can be more easily faded away by the acid.

As for the pigments useful as a color component in this case, there is not any particular limitation as long as they have optical coloring and tinting properties demanded of pigments. The pigments to be employed in this case may be further provided with other properties such as magnetism, fluorescence, conductivity, dielectric property, etc. in addition to the coloring and tinting properties. If the pigments are provided with these various properties, it may become possible to obtain an image having various functions. Further, the pigments may contain particles which are effective in providing an ink layer with increased heat resistance or physical strength.

As for the examples of pigments useful in this case, they include photoabsorptive pigments for example. Specific examples of such photoabsorptive pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments including, for example, dye chelate; nitro pigments; nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridone pigment; quinacridine pigment; and isoindolinone pigment.

As for the pigments that can be employed in the manufacture of a black ink, it is possible to employ carbon black such as Raven 5750, Raven 5250, Raven 5000, Raven 3500, Raven 1255 and Raven 700 (all available from Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all available from Cabot Co., Ltd.); No. 2300, No. 900, MCF88, No. 33, No. 40, No. 45, No. 52, MA7, MA8, MA100 and No. 2200B (all available from Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 (all available from Dexa Co., Ltd.).

As for the yellow pigments that can be employed in a yellow ink, examples thereof include Yellow 128, C.I. Pigment Yellow 129, C.I. Pigment Yellow 139, C.I. Pigment Yellow 151, C.I. Pigment Yellow 150, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I.

Pigment Yellow 114, and Pigment Yellow 180. In particular, it is more preferable, among these yellow pigments, to employ Pigment Yellow 180, since it can be hardly discolored by the effect of oxygen.

As for the pigments that can be employed in a magenta ink, examples thereof include C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Violet 19 and C.I. Pigment Red 112.

Further, as for the pigments that can be employed in a cyanine ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, and C.I. Vat Blue 60.

Further, it is also useful, as a color component, to employ white pigments such as natural clay, white lead, zinc white and metal carbonates such as magnesium carbonate, metal oxides such as barium and titanium. The inkjet ink containing white pigments can be employed not only in white printing but also in the amendments of printing or underlying images through overwriting.

As for fluorescent pigments, it is possible to employ not only inorganic fluorescence materials but also organic fluorescence materials. As for the inorganic fluorescence materials, specific examples of which include $MgWO_4$, $CaWO_4$, $(Ca, Zn)(PO_4)_2:Ti^+$, $Ba_2P_2O_7:Ti$, $BaSi_2O_5:Pb^{2+}$, $Sr_2P_2O_7:Sn^{2+}$, $SrFB_2O_{3.5}:Eu^{2+}$, $MgAl_{16}O_{27}:Eu^{2+}$, and inorganic acid salts such as tungstenate and sulfate. As for the organic fluorescence materials, specific examples of which include acridine orange, amino acridine, quinacrine, anilinonaphthalene sulfonate derivatives, anthroyl oxystearic acid, auramine O, chlorotetracycline, cyanine dye such as merocyaninen and 1,1'-dihexyl-2,2'-oxacarboxycyanine, dansyl sulfonamide, dansyl choline, dansyl galactoside, dansyl tolidine, dansyl chloride derivatives such as dansyl chloride, diphenyl hexatriene, eosin, ε-adenosine, ethidium bromide, fluorescein, foamycine, 4-benzoylamide-4'-aminostilbene-2, 2'-sulfonic acid, β-naphthyl triphosphic acid, oxonol dye, parinaric acid derivatives, perylene, N-phenylnaphthyl amine, pyrene, safranine O, fluorescamine, fluorescein isocyanate, 7-chloronitrobenzo-2-oxa-1,3-diazole, dansylaziridine, 5-(iodoacetamide ethyl) aminonaphthalene-1-sulfonic acid, 5-iodofluorescein, N-(1-anilinonaphthyl 4) maleimide, N-(7-dimethyl-4-methylcumanyl) maleimide, N-(3-pyrene) maleimide, eosin-5-iodoacetamide, fluorescein mercury acetate, 2-[4'-(2"-iodoacetamide)]aminonaphthalene-6-sulfonic acid, eosin, Rhodamine derivatives, organic EL dye, organic EL polymer, organic EL crystal and dendrimer.

As for the powder to be employed for enhancing the heat resistance and physical strength of ink layer, examples of which include oxides or nitrides of aluminum and silicon, filler and silicon carbide. For the purpose of providing the ink layer with electric conductivity, the ink may further contain conductive carbon pigment, carbon fiber, or powder of copper, silver, antimony and other noble metals. Iron oxide powder and ferromagnetic powder are suited for use in providing the ink layer with magnetic property. It is also possible to incorporate metal oxide powder such as tantalum oxide or titanium oxide exhibiting high dielectricity the recording ink.

It is also possible to incorporate dyes as an auxiliary component of pigment into the inkjet ink according to this embodiment. For example, dyes which are low in acidity and basicity and excellent in solubility to a solvent, such as azoic dye, sulfur (building materials) dye, disperse dye, fluorescent brightening agent and oil soluble dye can be employed. Among them, it is more preferable to employ oil soluble dye such as azo dye, triaryl methane dye, anthraquinone dye and azine dye. Specific examples of such oil soluble dye include C.I. Slovent Yellow-2, 6, 14, 15, 16, 19, 21, 33, 56, 61 and 80; Diaresin Yellow-A, F, GRN and GG; C.I. Slovent Violet-8, 13, 14, 21 and 27; C.I. Disperse Violet-1; Sumiplast Violet RR; C.I. Slovent Blue-2, 11, 12, 25 and 35; Diresin Blue-J, A, K and N; Orient Oil Blue-IIN, #603; and Sumiplast Blue BG.

These pigments and dyes described above may be employed singly or in combination of two or more. Further, for the purpose of enhancing the photoabsorbance, saturation and color vision, pigments and dyes can be employed in combination. Furthermore, in order to enhance the dispersibility of the pigments, these pigments may be subjected to treatments for enabling the pigments to bond with a high molecular binder or for micro-capsulizing the pigments.

The content of the color component should be confined within the range of 1 to 25% by weight based on the ink. If the content of the pigments is less than 1% by weight, it would become difficult to secure a sufficient color density. On the other hand, if the content of the color component is increased over 25% by weight, the delivery of the ink would be deteriorated. Therefore, the content of the color component should more preferably be confined within the range of 2 to 8% by weight based on the ink.

Further, the content of the powder components in the ink should preferably be confined within the range of 1 to 50% by weight. If the content of the powder components is less than 1% by weight, it would become difficult to expect sufficient effects of enhancing the sensitivity of the ink. On the other hand, if the content of the powder components is higher than 50% by weight, the resolution and sensitivity of the ink would be deteriorated.

The average particle diameter of the color component and of the powder components in the inkjet ink should be as small as possible. Generally, the average particle diameter of the color component and of the powder components is confined to not larger than $\frac{1}{3}$, more preferably not larger than about $\frac{1}{10}$ of the diameter of the opening of nozzle through which the inkjet ink is discharged. Incidentally, the diameter of the opening of nozzle is typically 10 μm or less, more preferably 1 μm or less. Therefore, when the settling of the color component and powder components is taken into consideration, a preferable particle diameter of the color component and of the powder components should be 0.35 μm or less as these components are to be employed as an ink for inkjet printing. Therefore, the average particle diameter of these components should be usually confined within the range of 0.1 to 0.3 μm.

(Compounds Polymerizable in the Presence of an Acid)

The compounds which are polymerizable in the presence of an acid can be employed as a solvent in the inkjet ink according to the embodiments of the present invention. This solvent is substantially formed of a polymerizable compound having such a feature. This expression of "solvent is substantially formed of a polymerizable compound" is intended to include not only a situation wherein "solvent is formed of only a polymerizable compound" but also a situation wherein "solvent is formed of a polymerizable compound and a minute amount of impurities which are unavoidably intermingled in the solvent". This "a minute amount of impurities which are unavoidably intermingled in the solvent" may be existed in the solvent at a concentration of, at most, not more than 10% by weight based a total weight of the solvent. More preferably, the content of "impurities which are unavoidably intermingled in the solvent" should be confined to not more than 5% by weight in general. If the content of impurities exceeds this upper limit, when residual impurities in the solvent may fly into air atmosphere, raising the problem of environmental safety or residual impurities may remain inside a cured material, thus deteriorating the curing property of the ink. Next, the components of the ink will be classified and explained in detail.

Vinylether Compounds (Essential Component)

The inkjet ink according to the embodiments of the present invention essentially comprises a vinyl ether compound. Further, at least 40% by weight of the acid-polymerizable compound should be occupied by a vinyl ether compound. If the aforementioned solvent is solely constituted by a vinyl ether compound, the content of the vinyl ether compound should preferably be confined to 30% by weight or more, more preferably 40% by weight or more based on a total weight of the inkjet ink. When the content of the vinyl ether compound is less than 30% by weight, the clogging of nozzle may generate or the photosensitivity of the ink may be deteriorated.

The vinyl ether compound should preferably be provided with a cyclic skeleton in viewpoint of polymerizability and curing hardness. More specifically, preferable examples of the vinyl ether compound are those represented by the following general formula (1).

$$R^{13}-R^{14}-(R^{13})_p \qquad (1)$$

Wherein $R^{13}$(s) is a group selected from vinyl ether group, a group having a vinyl ether skeleton, alkoxy group, hydroxyl-substituted group and hydroxyl group wherein at least one of $R^{13}$(s) is vinyl ether group or a group having a vinyl ether skeleton; $R^{14}$ is a group having a substituted or unsubstituted cyclic skeleton and a valence of (p+1); and p is a positive integer including zero. If $R^{14}$ is a cyclohexane cyclic skeleton and p is zero, it is preferable, in viewpoint of volatility, to employ the cyclic skeleton which is constituted by an oxygen-containing structure. More specifically, at least one of carbon atoms located on the ring should be constructed into a structure having a ketone structure, a structure where the carbon atom is substituted by oxygen atom, or a structure having an oxygen-containing substituent group.

The number of vinyl ether group to be introduced into the aforementioned molecular skeleton should preferably be as many as possible in view of improving curability. More specifically, although there is not any particular limitation, if it is desired to provide a cured ink layer with resolubility, the number of vinyl ether group should preferably be confined at most to about 2 or 3.

As for the specific examples of the cyclic group $R^{14}$ having a valence of (p+1), it is possible to employ substituted or unsubstituted aromatic rings such as (p+1)-valent groups including benzene ring, naphthalene ring and biphenyl ring. Alternatively, it is also possible to employ (p+1)-valent groups that can be derived from an alicyclic skeleton such as cycloalkane skeleton, norbornane akeleton, adamantane skeleton, tricyclodecane skeleton, tetracyclododecane skeleton, terpenoid skeleton or cholesterol skeleton. When these alicyclic skeletons having a crosslinkage structure are employed, the hardness of the cured material can be enhanced and hence the employment of such alicyclic skeletons is preferable. In viewpoint of volatility, it is preferable to employ the alicyclic skeleton which is constituted by an oxygen-containing structure. More specifically, at least one of carbon atoms located on the ring should be constructed into a structure having a ketone structure, a structure where the carbon atom is substituted by oxygen atom, or a structure having an oxygen-containing substituent group.

The compounds represented by the aforementioned general formula (1) generally have a viscosity ranging from 1 mPa·s to about 30 mPa·s. Accordingly, the employment of these compounds are effective in sufficiently reducing the viscosity of inkjet ink. For the purpose of fulfilling this effect, the mixing ratio of low viscosity vinyl ether compounds should be 40% by weight or more.

Among the compounds represented by the aforementioned general formula (1), those where at least one vinyl ether group is directly bonded to the ring are preferable since they are excellent in cation curability, which excellent property can be retained even if pigment is concurrently existed.

The employment of cyclic compounds comprising an aromatic skeleton is preferable since they are capable of enhancing the hardness of cured material or enhancing the solubility of a photosensitive agent, etc. Examples of such vinyl ether compounds include those where the hydroxyl group of the following alcohol compounds is substituted by vinyl ether or propenyl ether. Examples of such compounds include alcohols such as cumene alcohol represented by the following chemical formula Aro.1, vinyloxybenzene represented by the following chemical formula Aro.2, hydroquinone represented by the following chemical formula Aro.3, 1-carbomethoxy-4-vinyloxybenzene represented by the following chemical formula Aro.4, 2-hydroxynaphthalene represented by the following chemical formula Aro.5, 1-tert-butyl-4-vinyloxybenzene represented by the following chemical formula Aro.6, bisphenol A represented by the following chemical formula Aro.7, 1-octyl-4-vinyloxybenzene represented by the following chemical formula Aro.8, 1-hydroxy-3,5-dimethylbenzene represented by the following chemical formula Aro.9, 4-hydroxycumyl phenol represented by the following chemical formula Aro.10, and 3-isopropyl phenol represented by the following chemical formula Aro.11.

Following chemical formulas illustrate specific examples of such vinyl ether compounds.

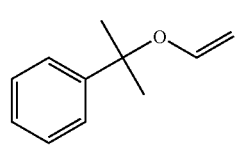

Aro. 1

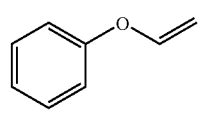

Aro. 2

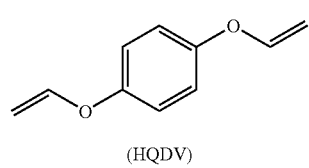

Aro. 3

(HQDV)

-continued

Aro. 4
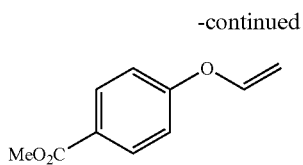

Aro. 5
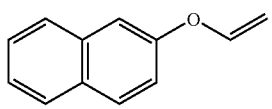

Aro. 6
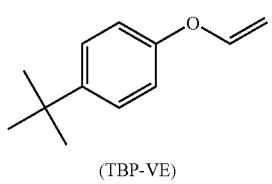
(TBP-VE)

Aro. 7
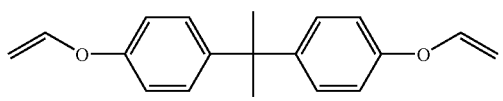

Aro. 8
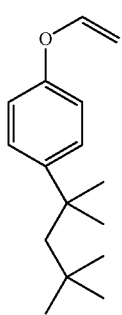

Aro. 9
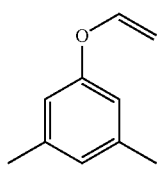

Aro. 10
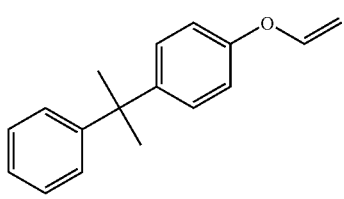

Aro. 11
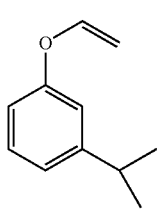

-continued

Aro. 12
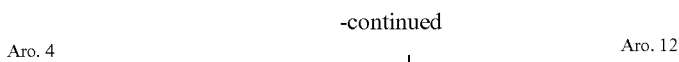
(TBMP-IP)

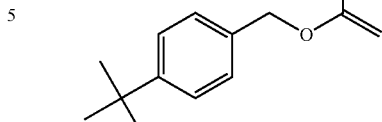

Aro. 13
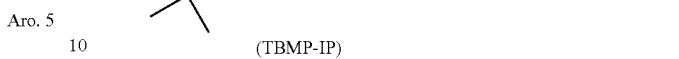

Aro. 14

Aro. 15

Aro. 16

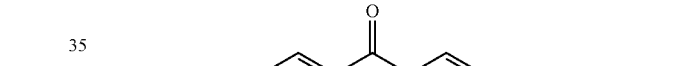

When the cyclic compounds are constituted by an alicyclic skeleton, they are more preferable than aromatic vinyl ethers in terms of odor and environmental safety. As for the vinyl ether compounds having such an alicyclic skeleton, it is more preferable to employ those having a monocyclic skeleton constituted by a 4-6 member ring, or those where the 4-6 member rings are bonded to each other, forming a crosslinking structure. Specific examples of such vinyl ether compounds are those where the hydroxyl group of the following alicyclic alcohol compounds is substituted by vinyl ether or propenyl ether for instance. Examples of the alicyclic alcohol compounds are cyclopentane mono(di)ol, cyclopentane mono(di)methanol, cyclohexane mono(di)ol, cyclohexane mono(di)methanol, norbornane mono(di)ol, norbornane monoolmonomethanol, norbornane mono(di)methanol, tricyclodecane mono(di)ol, tricyclodecane mono(di)methanol, adamantane mono(di)ol, etc.

More specifically, aforementioned alicyclic skeletons have structures represented by the following general formulas (VE1-a) and (VE1-b).

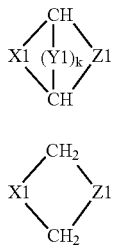

(VE1-a)

(VE1-b)

(Wherein X1 and Z1 are respectively alkylene group having 1 to 5 carbon atoms; Y1 is alkylene group having 1 to 2 carbon atoms; and k is 0 or 1.)

Specific examples of the aforementioned compounds are those where the hydroxyl group of the following alcohol compounds is substituted by vinyl ether or propenyl ether. Examples of such alcohol compounds are, for instance, 4-cyclohexane diol represented by the following chemical formula Ali.1, dicyclopentadiene methanol represented by the following chemical formula Ali.2, isoborneol represented by the following chemical formula Ali.3, 1-tert-butyl-4-vinyloxycyclohexanol represented by the following chemical formula Ali.4, trimethylcyclohexanol represented by the following chemical formula Ali.5, dihydroxyoctahydrophenyl represented by the following chemical formula Ali.6, hydroxytricyclodecanemonoene represented by the following chemical formula Ali.7, menthol represented by the following chemical formula Ali.8, 1,3-dihydroxycyclohexane represented by the following chemical formula Ali.9, decahydro-2-naphthalenol represented by the following chemical formula Ali.10, vinyloxycyclododecanol represented by the following chemical formula Ali.11, norbornane diol represented by the following chemical formula Ali.12, etc.

Following chemical formulas illustrate specific examples of such vinyl ether compounds.

Ali. 1

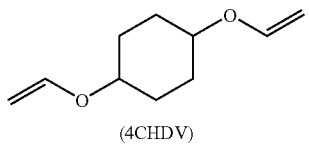

(4CHDV)

Ali. 2

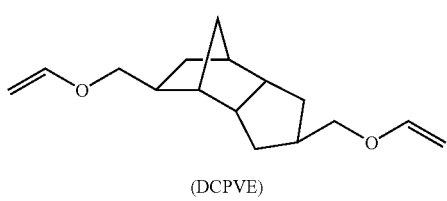

(DCPVE)

Ali. 3

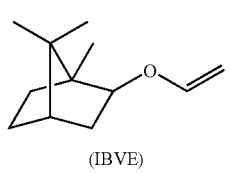

(IBVE)

Ali. 4

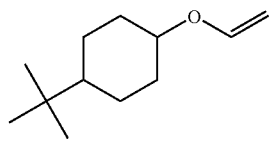

Ali. 5

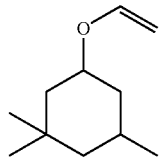

Ali. 6

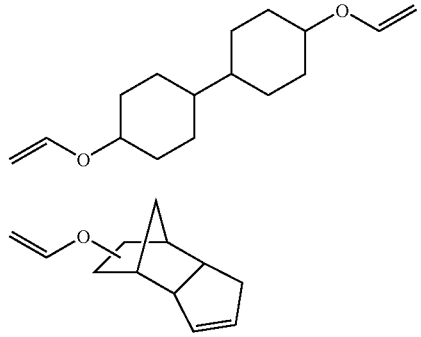

Ali. 7

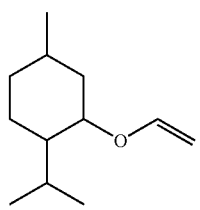

Ali. 8

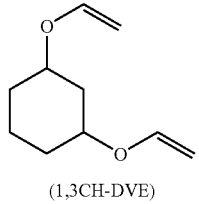

(MTVE)

Ali. 9

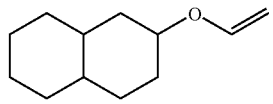

(1,3CH-DVE)

Ali. 10

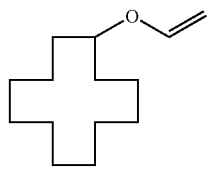

Ali. 11

Ali. 12

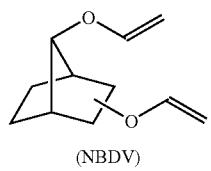

(NBDV)

-continued

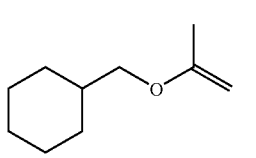

(CHM-IP)

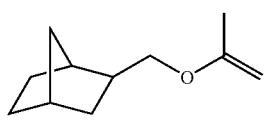

(NMB-IP)

Among the aforementioned compounds, those having an alicyclic skeleton of bridged structure is more preferable since they are capable of enhancing the hardness of cured material. Although there are also known RAPI-CURE CHVE: cyclohexane dimethanoldivinyl ether and RAPI-CURE CHMVE: cyclohexane dimethanolmonovinyl ether (all available from ISP Japan Co., Ltd.), since these compounds are constructed such that vinyl ether is not directly bonded to a cyclic skeleton, they are liable to become poor in terms of acid-polymerizability.

Among the compounds having the aforementioned alicyclic skeleton, those having an oxygen-containing structure such as a structure where one or some of carbon atoms of the ring are substituted by oxygen atom, or a structure having an oxygen-containing substituent group are preferable in terms of volatility and pigment dispersibility.

As for the vinyl ether compounds having a ring structure having the aforementioned acid-containing substituent group, it is possible to employ those having a monocyclic skeleton constituted by a 4-6 member ring, or those where the 4-6 member rings are bonded to each other, forming a crosslinking structure. More specifically, it is possible to employ vinyl ether compounds which are formulated such that, for example, at least one of hydroxyl groups of alcohol compounds is substituted by ether or ester such as methoxy group, methoxyethoxy group, alkoxy group, acetoxy group or alkylester group, and the rest is substituted by vinyl ether or propenyl ether. Examples of such alcohol compounds include cyclopentane diol, cyclohexane di(tri)ol, cyclohexane di(tri)methanol, norbornane di(tri)ol, norbornane mono(di)ol mono(di)methanol, norbornane di(tri)methanol, tricyclodecane di(tri)ol, tricyclodecane di(tri)methanol, adamantane di(tri)ol, etc.

More specifically, vinyl ether compounds having oxygen-containing substituent group and represented by the following chemical formula are most preferable.

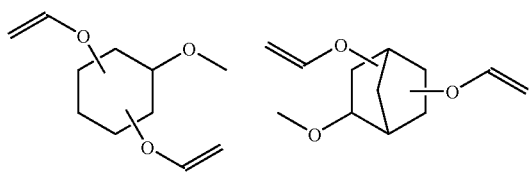

On the other hand, vinyl ether compounds having oxygen atom included inside the alicyclic skeleton is more preferable, since such compounds are capable of further enhancing the stability of viscosity. Specific examples such compounds are those represented by the following general formula (VE2-a) or (VE2-b).

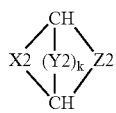

(VE2-a)

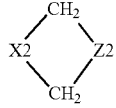

(VE2-b)

(Wherein at least one of X2, Y2 and Z1 contains at least one oxygen atom; X2 and Z2 are respectively alkylene group having 1 to 5 carbon atoms or bivalent organic group containing oxygen atom as ether linkage; Y2 is oxygen atom, alkylene group having 1 to 2 carbon atoms, or bivalent organic group containing oxygen atom as ether linkage; and k is 0 or 1.)

These compounds described above are characterized by excellent environmental safety and curability which are peculiar to the alicyclic skeleton and by the inclusion of a cyclic hydrocarbon skeleton having oxygen atom as a ring-constituting atom and exhibiting a high surface tension, thus enabling them to have high solubility or dispersibility. Additionally, in order to minimize the phenomenon of run-away of ink by a relatively hydrophilic printing medium, the employment of the vinyl ether compounds provided with all of these features is most preferable.

As for the vinyl ether compounds having such an alicyclic skeleton as constructed above, it is more preferable to employ those having a cyclic ether skeleton constituted by a 4-6 member ring. Specific examples of such vinyl ether compounds are those where the hydroxyl group of the following alcohol compounds is substituted by vinyl ether or propenyl ether for instance. Examples of the alcohol compounds are substituted or unsubstituted oxetane monool, substituted or unsubstituted oxetane monomethanol, oxapentane mono(di)ol, oxacyclohexane mono(di)ol, isosorbitol, mannitol, oxanorbornane mono(di)ol, oxanorbornane monoolmonomethanol, oxanorbornane mono(di)methanol, oxatricyclodecane mono(di)ol, oxaadamantane mono(di)ol, and dioxorane methanol, etc.

Among these compounds, it is more preferable to employ those having a structure represented by the aforementioned general formulas (VE2-a) or (VE2-b) wherein a ratio between the number of oxygen atom and the number of carbon atom (number of oxygen atom/number of carbon atom) is higher than 0.08. It is possible, through the employment of these vinyl ether compounds, to obtain an ink which is capable of exhibiting preferable physical properties which are related to polarity such as solubility and wettability to a printing medium. The ratio of (number of oxygen atom/ number of carbon atom) should preferably be not less than 0.15, more preferably not less than 0.25.

Specific examples of the vinyl ether compounds are CasNo. 22214-12-6 and CasNo. 20191-85-9. As exemplified by these compounds, compounds having a distorted cyclic ether structure such as oxetane ring or hydrofuran ring are preferable for use since such compounds are capable of enhancing the reactivity. Among them, compounds having hydrofuran ring is preferable in terms of volatility. Further, when these cyclic structures are constructed to have a bridged structure, the curing hardness of ink can be enhanced and hence compounds having such a structure are most preferable.

More specifically, the employment of the following vinyl ethers are most preferable.

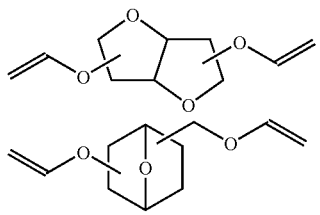

A series of the aforementioned vinyl ether compounds can be suitably synthesized by the methods described in J. Chem. Soc., 1965(2)1560-1561 or in J. Am. Chem. Soc. vol. 124, No. 8, 1590-1591(2002). If these methods are to be employed, corresponding aromatic alcohols or alicyclic alcohols are employed as a raw material and reacted with acetic esters of vinyl ether or propenyl ether in the presence of a catalyst such as iridium halide. By using these methods, vinyl ether or propenyl ether aimed at can be easily manufactured. For example, menthol and vinyl acetate are mixed together in a mixed solution comprising sodium carbonate and toluene with an iridium compound being employed as a catalyst under heating and in an argon atmosphere, thereby obtaining menthol vinyl ether (MTVE).

These synthesizing methods can be suitably applicable to any kinds of compounds exemplified in this specification.

(Other Kinds of Acid-polymerizable Compounds that Can be Added)

The employment singly of aforementioned vinyl ether compounds is most preferable in terms of curing property of ink. However, as long as this curing property is not prominently degraded, it is possible to employ them in combination with other kinds of compounds which are polymerizable in the presence of an acid. Employing such compounds may increase storage stability or solubility of a photosensitizer, and provid properties such as appropriate plasticity and glossiness.

As for the specific examples of the compounds which are polymerizable in the presence of an acid and useful in this case, as long as they are generally known as an acid-polymerizable, it is possible to employ without any particular limitation. For example, it is possible to employ compounds having a cyclic ether group such as epoxy group, oxetane group and oxorane group; acrylic or vinyl compounds having the aforementioned substituent groups on their side chain; carbonate compounds; low molecular melamine compounds; vinyl carbazoles; styrene derivatives; alpha-methylstyrene derivatives; vinyl alcohol esters including esters of vinyl alcohol with acryl or methacryl; and monomers having a cation polymerizable vinyl bond. These compounds can be employed singly or in combination of two or more. It is not necessarily possible to obtain excellent properties in the employment of all of these compounds, but it is possible, only through a specific combination thereof for specific purposes, to enhance other properties without deteriorating the curing property of ink. Details about this will be explained below.

(Epoxy Compound)

In addition to the vinyl ether compounds represented by the aforementioned general formula (1), it is possible to employ the following compounds. Namely, it is possible to employ compounds represented by the following general formula (11) or (12) and characterized by having a hydrocarbon group having a bivalent aliphatic or alicyclic skeleton each having 1 to 15 carbon atoms, or characterized by having epoxy or alicyclic epoxy group at one or both sites of bivalent group having, at a portion thereof, an aliphatic chain or alicyclic skeleton.

$$R1-A1-R2 \quad (11)$$

$$R3-A2 \quad (12)$$

In these general formula (11) or (12), R1, R2 and R3 represent individually epoxy group or epoxy group having an alicyclic skeleton; A1 and A2 represent individually an aliphatic chain, an alicyclic skeleton, or a bivalent hydrocarbon group comprising an aliphatic skeleton or an alicyclic skeleton each having 1 to about 15 carbon atoms. Among the carbon atoms of the aliphatic chain or alicyclic skeleton, one or some of carbon atoms may be substituted by oxygen atom or constructed to provide a ketone skeleton.

The compounds represented by the general formula (11) or (12) generally have a viscosity ranging from 5 mPa·sec to 100 mPa·sec, so that there is little possibility that the inclusion of the compounds would badly affect the delivery of ink. In particular, although the inclusion of alicyclic epoxy compounds is preferable in the case where the enhancement of acid-polymerizability or of the solubility of photosensitive agents is desired, it will tend to decrease the curing rate of ink and deteriorate the storage stability and solvent resistance. Accordingly, an appropriate mixing ratio of these compounds should be confined within the range of 0 to 60% based on a total weight of the acid-curable compounds.

When the ink after curing is demanded to have plasticity and glossiness, the epoxy compounds represented by the following general formula (13) may be employed. The alicyclic epoxy compounds represented by the general formula (13) generally have a viscosity of as high as 50 mPa·sec to 10000 mPa·sec or more.

$$R4-A3-(R5)_k \quad (13)$$

In the general formula (13), R4 and R5 represent individually epoxy group or epoxy group having an alicyclic skeleton; and A3 represents (k+1)-valent functional group having at least alkylene group and/or an alicyclic skeleton (k is a natural number).

For example, if a vinyl ether compound is incorporated into inkjet ink at a ratio ranging from 50 parts by weight to 90 parts by weight based on 100 parts by weight of the inkjet ink, the aforementioned epoxy compound of high viscosity should preferably be incorporated into the inkjet ink at a ratio ranging from 10 parts by weight to 40 parts by weight based on 100 parts by weight of the inkjet ink. By doing so, it is possible to ensure minimum fluidity (a viscosity of 30 mPa·sec or less at a temperature of 50° C.) which is required in the delivery of ink. It is especially desirable that the weigh ratio between the vinyl ether compound and the high-viscosity compound is limited to the range of 1:1 to 10:1. If the vinyl ether compound and the high-viscosity compound are to be employed in combination as explained above, it is desirable to employ the compounds represented by the aforementioned general formula (4) or (5) as a photo-acid generating agent and to limit the mixing ratio of the pigment to the range of 1 to 25 parts by weight based on 100 parts by weight of the inkjet ink. In particular, when an epoxy compound of high molecular weight and having a viscosity of as high as 500 mPa·sec or more is incorporated into the ink, it would be possible to obtain a printed layer excellent in plasticity and glossiness. According to the formulation as described above, it is now possible to prepare an inkjet ink which can be delivered or discharged in an appropriate manner and is capable of providing a cured material with excellent plasticity and glossiness.

When the epoxy compounds represented by the following general formula (16) are employed in combination with the aforementioned vinyl ether compounds, the storage stability of inkjet ink as well as the plasticity of ink layer can be enhanced.

  (16)

In this general formula (16), $R^{11}$ is glycidyl ether group; $R^{12}$ is alkylene or hydroxyl-substituted alkylene group having 1 to 6 carbon atoms, or alkylene group having an alicyclic or hydroxyl-substituted alicyclic skeleton and 6 to 15 carbon atoms; and j is an integer ranging from 1 to 3. Especially, diglycidyl ether compound of neopentyl glycol exhibits such an excellent properties that is almost unique in view of viscosity, degree of acid polymerization, and storage stability. However, the addition of these compounds in an excessive quantity would deteriorate curing property of ink, so that the aforementioned epoxy compounds should preferably be incorporated at a ratio of 10 to 40 parts by weight based on 100 parts by weight of inkjet ink provided that the mixing ratio of the vinyl ether compounds is confined within the range of 50 to 90 parts by weight based on 100 parts by weight of inkjet ink.

As for specific examples of the aforementioned epoxy compounds, they include alicyclic epoxy compounds such as Celloxide 2021, Celloxide 2021A, Celloxide 2021P, Celloxide 2081, Celloxide 2000 and Celloxide 3000 (all available from Daicel Chemical Industries Ltd.); (metha) acrylate compounds having epoxy group, such as Cyclomer A200 and Cyclomer M100; methacrylate having methylglycidyl group such as MGMA; glycidol representing a low molecular epoxy compound; β-methylepichlorohydrin; α-pinene oxide; α-olefin monoepoxide having 12 to 14 carbon atoms; α-olefin monoepoxide having 16 to 18 carbon atoms; epoxidized soy bean oil such as Dimac S-300K; epoxidized linseed oil such as Dimac L-500; and polyfunctional epoxy compounds such as Epolead GT301 and Epolead GT401.

It is also possible to employ alicyclic epoxy compounds (such as Cylacure; Dow Chemical Co., Ltd, U.S.); low molecular weight phenol compounds which are hydrogenated and aliphatized with terminal hydroxyl group thereof being substituted by a group having epoxy; glycidyl ether of polyhydric aliphatic alcohol/alicyclic alcohol such as ethylene glycol, glycerin, neopentyl alcohol, hexanediol and trimethylol propane; compounds having glycidyl ether group at an terminal of ethylene oxide-based polymer; epoxy compounds wherein terpene compounds having an unsaturated bond are employed as a starting material and the unsaturated bond is oxidized to obtain the epoxidized compounds; and glycidyl esters of hexahydrophthalic acid or hydrogenated aromatic polyhydric carboxylic acid.

(Oxetane Compounds)

Oxetane compounds can be suitably employed as a portion of the acid-polymerizable compounds. For example, in a situation where high speed printing of several tens meters per minute is demanded or where the resistance to a solvent is required, it is preferable that an oxetane compound is incorporated in the ink. When oxetane compound is employed as a major component in the conventional inkjet ink, the viscosity of the ink is generally caused to increase prominently, thus making it difficult to adjust the viscosity relative to other solvent. However, when the oxetane compound is employed in combination with a vinyl ether compound, it can be easily formulated into ink since the vinyl ether compound is very low in viscosity.

As for the oxetane compound, it may be aromatic, aliphatic or alicyclic oxetane compound, and it may include ether bond in part of the structure thereof. With respect to mixing ratio between the oxetane compound and the vinyl ether compound, it is preferable, in view of solvent resistance, to employ an aromatic oxetane compound at a ratio ranging from 0 to 40% by weight, and it is also preferable, in view of suitability of viscosity, to employ the vinyl ether compound at a ratio of not less than 60% by weight. Further, in view of promoting the curing of ink, a total quantity of the oxetane compound in the ink should preferably be at least 40% by weight or more, and furthermore, in view of optimizing the cured hardness of ink, a total quantity of the compounds having an alicyclic skeleton and an aromatic skeleton should preferably be at least 30% by weight or more of the ink.

If the mixing ratios of these compounds fall outside these ranges, it may become difficult to obtain an ink which is capable of satisfying all of the properties such as curing rate, delivery performance, solvent resistance, etc.

Specific examples of aliphatic or alicyclic oxetane compounds of include di[1-ethyl(3-oxetanyl)] methyl ether, 3-ethyl-3-(2-ethylhexyloxymethyl) oxetane, [(1-ethyl-3-oxetanyl)methoxy] cyclohexane, bis[(1-ethyl-3-oxetanyl) methoxy] cyclohexane or compounds comprising an alicyclic group to which at least one oxetane-containing group is introduced such as bis[(1-ethyl-3-oxetanyl)methoxy] norbornane. It is also possible to employ ether compounds comprising aliphatic polyhydric alcohol such as ethylene glycol, propylene glycol and neopentyl alcohol, to which oxetane-containing alcohol such as 3-ethyl-3-hydroxymethyl oxetane is dehydrocondensed.

Specific examples of the oxetane compounds comprising an aromatic skeleton include 1,4-bis[(1-ethyl-3 oxetanyl) methoxy] benzene, 1,3-bis[(1-ethyl-3 oxetanyl)methoxy] benzene, 4,4'-bis[(3-ethyl-3 oxetanyl)methoxy] biphenyl, and phenol novolac oxetane.

However, the addition of an excessive quantity of these compounds may bring about malfunction in delivery of ink, so that the aforementioned oxetane compounds should preferably be incorporated at a ratio of 10 to 60 parts by weight based on 100 parts by weight of inkjet ink provided that the mixing ratio of the vinyl ether compounds is confined within the range of 50 to 90 parts by weight based on 100 parts by weight of inkjet ink. In particular, when an oxetane compound of high molecular weight and having a viscosity of as high as 500 mPa·sec or more is incorporated into the ink, it would be possible to obtain a printed layer excellent in plasticity and glossiness.

(Cyclic Esters, Cyclic Carbonate-based Acid-polymerizable Compounds)

Most of the photo-acid generating agents to be included as an essential component in the inkjet ink according to the embodiments of the present invention are poor in solubility to acid-polymerizable compounds such as vinyl ether compounds. When the solubility of the photo-acid generating agents to the inkjet ink is poor, the sensitivity of the ink would become insufficient on the occasion of irradiation of light, thus possibly leading to an insufficient hardness of the cured film of ink. Otherwise, the photo-acid generating agent that has been failed to dissolve may exist as an impurity such as coarse particles, thus raising problems such as the obstruction of stable delivery of ink.

In that case, it is effective to incorporate, into the ink, cyclic carbonate or cyclic lactone compounds which are capable of dissolving the photo-acid generating agents in a very excellent manner. For example, propylene carbonate which is one of cyclic carbonate has a solubility parameter of about 27 $MPa^{1/2}$ and is liable to indicate a higher polarity than that of the acid-polymerizable compounds. Therefore, even if a photo-acid generating agent which can be hardly dissolved in the acid-polymerizable compounds is to be employed, the solubility of the photo-acid generating agent can be enhanced by the addition of only a little amount of this propylene carbonate.

Further, propylene carbonate is polymeric, so that even if propylene carbonate is employed in the inkjet ink, there is little possibility that propylene carbonate is discharged into air atmosphere as a volatile component after the curing of ink layer. As for other specific examples of cyclic carbonate or cyclic lactone compounds which can be preferably employed in all kinds of the inkjet ink according to the embodiments of the present invention, they include propylene carbonate propenylether, dimethyl carbonate, diphenyl carbonate, etc. However, since the addition of an excessive quantity of these compounds may deteriorate the curing property of ink, these cyclic compounds should preferably be incorporated at a ratio of 5 to 40 parts by weight based on 100 parts by weight of inkjet ink provided that the mixing ratio of the vinyl ether compounds is confined within the range of 50 to 90 parts by weight based on 100 parts by weight of inkjet ink.

(Other Kinds of Acid-polymerizable Compounds that Can be Added to the Inkjet Ink)

Additionally, the following compounds can be also added to the inkjet ink.

Namely, it is possible to employ high-molecular weight compounds including, for example, compounds having a molecular weight of 5000 or less and comprising a cyclic ether group such as epoxy group, oxetane group and oxorane group, which are bonded through a long chain alkylene group; acrylic or vinyl compounds having the aforementioned substituent groups; carbonate compounds; low molecular melamine compounds; vinyl ethers; vinyl carbazoles; styrene derivatives; alpha-methylstyrene derivatives; vinyl alcohol esters including esters of vinyl alcohol with acryl or methacryl; monomers monomers having a cation polymerizable vinyl bond; and oligomers formed through the polymerization of at least one kind of the monomers.

Further, the inkjet ink may contain the following compounds in addition to the aforementioned compounds. Namely, they include a homopolymer or copolymer of vinyl alcohol; resins containing OH group, COOH group, acetal group, etc. and having a molecular weight of 5000 or less such as casein and cellulose; polycarbonate resins having a molecular weight of 5000 or less; copolymers to be derived from a reaction between polyamic acid, polyamino acid or acrylic acid and a vinyl compound having an acid-polymerizable double bond on its side chain; copolymers to be derived from a reaction between vinyl alcohol and a vinyl compound having an acid-polymerizable double bond on its side chain; and methylol melamine resin.

(Other Kinds of Compounds that Can be Incorporated into the Inkjet Ink)

The photosensitive compositions according to the present invention may also contain a basic additive, a dispersing agent, a surfactant, a radical polymeric monomer, a radical generating agent, a specific kind of solvent which is not acid-polymerizable, etc. Next, these components will be classified and explained in detail.

(Basic Compounds)

The inkjet ink should desirably be high in stability in inkjet discharging. However, the inkjet ink is generally inclined to become prominent in the increase with time of viscosity so that the preferable properties of them can be retained only a short period of time if they are left as they are. Therefore, it is desirable that the inkjet ink additionally contains, as a viscosity stabilizing agent, a basic compound and/or a compound capable of expressing basicity. If carbon black is employed as a color component, the effects of these viscosity stabilizing agents can be exhibited more prominently. Moreover, since these basic compounds are concurrently capable of effectively protecting not only the interior of the inkjet head of recording apparatus but also the metal portions of the piping for the ink from being eroded by acids, the employment of these basic compounds are preferable in all kinds of the inkjet ink according to the embodiments of the present invention.

As for the aforementioned basic compound, it is possible to employ any inorganic basic materials as well as organic basic materials which are capable of being dissolved in a compound that can be polymerized in the presence of an acid. However, in view of solubility, the employment of organic basic materials is more preferable. Specific examples of such organic basic materials include ammonia compound, ammonium compounds, substituted or unsubstituted alkylamine, substituted or unsubstituted aromatic amine, pyridine, pyrimidine, and organic amines having a hetrocyclic skeleton such as imidazole. More specific examples of such organic basic materials include n-hexyl amine, dodecyl amine, aniline, dimethyl aniline, diphenyl amine, triphenyl amine, diazabicyclooctane, diazabicycloundecane, 3-phenyl pyridine, 4-phenyl pyridine, lutidine, 2,6-di-t-butylpyridine, and sulfonyl hydrazides such as 4-methylbenzene sulfonyl hydrazide, 4,4'-oxybis(benzenesulfonyl hydrazide) and sulfonyl hydrazide such as 1,3-benzenesulfonyl hydrazide.

Ammonium compounds can be also employed as a basic compound. Preferable examples of the ammonium compounds are quaternary ammonium salts which can be represented by the following general formula (23).

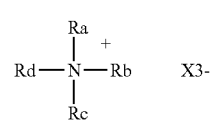

(23)

(In this general formula (23), $R_a$, $R_b$, $R_c$ and $R_d$ may be the same or different and are individually alkyl, cycloalkyl, alkylaryl or aryl, wherein one or more of aliphatic group $CH_2$ may be substituted by oxygen atom; and X3- represents a basic anion.)

Among the compounds represented by the aforementioned general formula (23), preferable examples thereof include the compounds wherein $R_a$, $R_b$, $R_c$ and $R_d$ are selected from the group consisting of methyl, ethyl, propyl, isopropyl, butyl, dodecyl, phenyl and benzyl; and X3- is selected from the group consisting of hydroxyl ion, $^-$OR (R is alkyl having 1 to 4 carbon atoms), $^-$OCOR'(R' is alkyl, aryl or alkylaryl), OCOO$^-$ and OSOO$^-$. Especially preferable examples of the basic compounds are tetramethyl ammonium hydroxide and ammonium salt of tetrabutyl hydroxide. These basic compounds can be employed singly or in combination of two or more.

With regard to the basicity of the basic compounds to be employed as a viscosity-stabilizing agent in the present invention, it is preferable to employ basic compounds exhibiting a base dissociation constant pKb of 3 or more at a temperature of 25° C. and in a state of aqueous solution thereof, provided that the vinyl ether compounds are employed singly or in combination with oxetane compounds. However, if the pKb of the basic compounds is higher than 7, such compounds would be incapable of exhibiting the effect of stabilizing the viscosity of ink. Suitable examples of basic compounds which are capable of satisfying the aforementioned conditions are aliphatic amines and substituted aliphatic amines.

However, if the vinyl ether compounds of the present invention are employed together with an epoxy compound and at the same time, a basic compound exhibiting a very strong basicity such as imidazole is employed in this case, the polymerization thereof with time may occur or otherwise, a side reaction such as decomposition of photo-acid generating agent may be likely to take place. On the other hand, if a basic compound which is very weak in basicity is employed in this case, it would become difficult to sufficiently secure the effect of stabilizing the viscosity of ink through the addition of the basic compound. For example, it is preferable to employ basic compounds exhibiting a base dissociation constant pKb of 4 or more at a temperature of 25° C. and in a state of aqueous solution thereof. However, if the pKb of the basic compounds is higher than 11, such compounds would be incapable of exhibiting the effect of stabilizing the viscosity of ink. Suitable examples of basic compounds which are capable of satisfying the aforementioned conditions are pyridine derivatives, aniline derivatives, aminonaphthalene derivatives, other kinds of nitrogen-containing heterocyclic compounds and the derivatives thereof.

Specific examples of the pyridine derivatives include 2-fluoropyridine, 3-fluoropyridine, 2-chloropyridine, 3-chloropyridine, 3-phenylpyridine, 2-benzylpyridine, 2-formylpyridine, 2-(2'-pyridyl) pyridine, 3-acetylpyridine, 2-bromopyridine, 3-bromopyridine, 2-iodopyridine, 3-iodopyridine, and 2,6-di-tert-butylpyridine.

Specific examples of the aniline derivatives include aniline, 4-(p-aminobenzoyl) aniline, 4-benzylaniline, 4-chloro-N,N-dimethylaniline, 3-5-dibromoaniline, 2,4-dichloroaniline, N,N-dimethylaniline, N,N-dimethyl-3-nitroaniline, N-ethylaniline, 2-fluoroaniline, 3-fluoroaniline, 4-fluoroaniline, 2-iodoaniline, N-methylaniline, 4-methylthioaniline, 2-bromoaniline, 3-bromoaniline, 4-bromoaniline, 4-bromo-N,N-dimethylaniline, 2-chloroaniline, 3-chloroaniline, 4-chloroaniline, 3-chloro-N,N-dimethylaniniline, 3-nitroaniline, 4-nitroaniline, 2-methoxyaniline, 3-methoxyaniline, diphenylamine, 2-biphenylamine, o-toluidine, m-toluidine, p-toluidine, 3,3'-diaminodiphenyl sulfone, 4,4'-diaminodiphenyl sulfone, and 4,4'-bis(4-aminophenoxy) diphenyl sulfone.

Specific examples of the aminonaphthalene derivatives include, for example, 1-amino-6-hydroxynaphthalene, 1-naphthylamine, 2-naphthylamine, diethylaminonaphthalene, and N-methyl-1-naphthylamine.

Specific examples of other kinds of nitrogen-containing heterocyclic compounds and the derivatives thereof include, for example, cinnoline, 3-acetylpiperidine, pyrazine, 2-methylpyraxzine, methylaminopyrazine, pyridazine, 2-aminopyrimidine, 2-amino-4,6-dimethylpyrimidine, 2-amino-5-nitropyrimidine, 2,4,6-triamino-1,3,5-triazine, pyrrol, pyrazole, 1-methylpyrazole, 1,2,4-triazole, indazole, benzotriazole, quinazoline, quinoline, 3-aminoquinoline, 3-bromoquinoline, 8-carboxyquinoline, 3-hydroxyquinoline, 6-methoxyquinoline, 5-methylquinoline, quinoxaline, thiazole, 2-aminothiazole, 3,4-diazaindole, purine, 8-azapurine, indole and indolizine.

As for the aliphatic amines and the derivatives thereof, amine derivatives represented by the following general formula (21) can be employed.

(21)

In the general formula (21), $R^{21}$, $R^{22}$ and $R^{23}$ may be the same or different and at least one of them is substituted or unsubstituted alkyl group and the rest are individually hydrogen atom, hydroxyl group or substituted or unsubstituted alkyl group. The amine compounds represented by the general formula (21) can be used in combination with oxetane compounds or vinyl ether compounds.

When the aforementioned basic compounds are capable of forming a salt in combination with anions represented by the following general formula (22) and the anions are low in acidity, the basic compounds would act by itself as a weak base. Therefore, the salts can be employed in the same manner as described above.

(22)

In the general formula (22), A$^-$ is a compound having sulfonate anion or carboxyl anion; $R^{21}$, $R^{22}$ and $R^{23}$ may be the same or different and are individually substituted or unsubstituted aromatic group, hydrogen atom, hydroxyl group or substituted or unsubstituted alkyl group.

The inkjet ink according to the embodiments of the present invention may be heated after a step of exposure, so that the volatility of the basic compounds should preferably be as low as possible. More specifically, the boiling point of the basic compounds should preferably be 150° C. or more, more preferably 180° C. or more at the ordinary pressure.

The basic compounds or compounds capable of exhibiting basicity, both being employed as a viscosity-stabilizing agent, should preferably be incorporated into the inkjet ink at a ratio of 1 to 30 mol %, more preferably at a ratio of 2 to 15 mol % based on a total molar quantity of a photo-acid generating agent. If mixing ratio of these compounds falls outside this range, the sensitivity of ink would be considerably deteriorated or the effects thereof to stabilize the viscosity of ink would be varnished.

When a photosensitive basic compound that can be decomposed through the irradiation of light or radiation is employed, any decrease of sensitivity due to the addition of a basic compound can be minimized and hence the employment of such a photosensitive basic compound is referable.

As for the photo-sensitive basic compound, it is possible to preferably employ sulfonium compounds and iodonium compounds. As for the sulfonium compounds, the compounds represented by the following general formulas (SS1) to (SS4) can be exemplified.

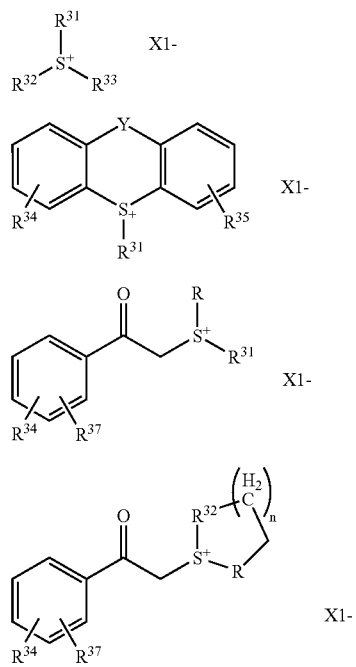

(Wherein $R^{31}$, $R^{32}$ and $R^{33}$ may be the same or different and are individually alkyl group, aryl group, heteroaryl group, or aryl group substituted by alkyl group, alkylaryl group, halogen atom, alkoxy group, phenoxy group, thiophenol group, phenylsulfonyl group or phenylsulfenyl group; Y is $CH_2$, O or S; $R^{34}$, $R^{35}$, $R^{36}$ and $R^{37}$ may be the same or different and are individually alkyl group, alkoxy group or halogen atom; and X1- represents a basic anion.)

Preferable examples of $R^{31}$, $R^{32}$ and $R^{33}$ include methyl, ethyl, propyl, isopropyl, butyl, phenyl, biphenyl, tolyl, xylyl, chlorophenyl, bromophenyl, methoxyphenyl, ethoxyphenyl, propyloxyphenyl, butyloxyphenyl, tert-butyloxyphenyl, phenoxyphenyl, thiophenoxyphenyl, phenoxyphenyl, thiophenoxyphenyl and phenylsulfonylphenyl.

Preferable examples of $R^{34}$, $R^{35}$, $R^{36}$ and $R^{37}$ include alkyl group, methoxy group, ethoxy group, chlorine atom and bromine atom.

Specific examples of X1- include anions such as hydroxyl ion, $^-$OR (R is alkyl having 1 to 4 carbon atoms), $^-$OCOR' (R' is alkyl, aryl or alkylaryl), OCOO$^-$ and OSOO$^-$.

As for the iodonium compounds, the compounds represented by the following general formulas (IS1) to (IS3) can be exemplified.

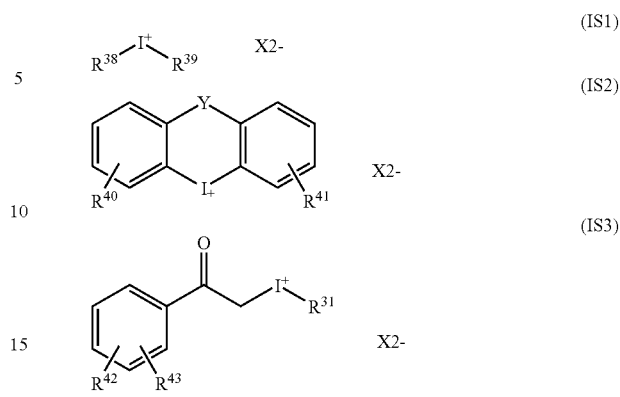

wherein $R^{38}$ and $R^{39}$ may be the same or different and are individually alkyl group, aryl group, heteroaryl group or mono, di or tri-substituted aryl group which is substituted by alkyl group, aryl group, halogen atom, alkoxy group, phenoxy group, thiophenol group, phenylsulfonyl group or phenylsulfenyl group; Y is $CH_2$, O or S; $R^{40}$, $R^{41}$, $R^{42}$ and $R^{43}$ may be the same or different and are individually alkyl group, alkoxy group or halogen atom; n is an integer of 5 or 6; and X2- represents a basic anion.

Preferable examples of $R^{38}$ and $R^{39}$ include methyl, ethyl, propyl, isopropyl, butyl, phenyl, biphenyl, tolyl, xylyl, chlorophenyl, bromophenyl, methoxyphenyl, ethoxyphenyl, propyloxyphenyl, butyloxyphenyl, tert-butyloxyphenyl, phenoxyphenyl, thiophenoxyphenyl, phenoxyphenyl, thiophenoxyphenyl and phenylsulfonylphenyl.

Preferable examples of $R^{40}$, $R^{41}$, $R^{42}$ and $R^{43}$ include alkyl group, methoxy group, ethoxy group, chlorine atom and bromine atom.

Specific examples of X2- include anions such as hydroxyl ion, $^-$OR (R is alkyl having 1 to 4 carbon atoms), $^-$OCOR' (R' is alkyl, aryl or alkylaryl), OCOO$^-$ and OSOO$^-$.

Especially preferable examples of such sulfonium compounds and iodonium compounds are triphenylsulfonium acetate, triphenyl sulfonium hydroxide, triphenyl sulfonium phenolate, tris-(4-methylphenyl) sulfonium hydroxide, tris-(4-methylphenyl) sulfonium acetate, tris-(4-methylphenyl) sulfonium phenolate, diphenyl iodonium hydroxide, diphenyl iodonium acetate, diphenyl iodonium phenolate, bis-(4-t-butylphenyl) iodonium hydroxide, bis-(4-t-butylphenyl) iodonium acetate, bis-(4-t-butylphenyl) iodonium phenolate, thiophenyl-substituted triphenylsulfonium acetate, and thiophenyl-substituted triphenylsulfonium hydroxide.

In addition to the aforementioned basic compounds, it is also possible to incorporate other basic compounds into the ink. Further, if onium salts are to be employed as a photo-acid generating agent, the photo-acid generating agent should preferably be selected from those which are similar in kinds to the basic compound. For example, if the photo-acid generating agent and the basic compound are both formed of sulfonium compounds or iodonium compounds, it would be possible to obtain excellent effects in terms of sensitivity and shelf life stability.

Alternatively, it is also possible to preferably employ a compound which is not inherently basic but is capable of generating a basic compound through the decomposition thereof with time, since the basic compound thus generated can act to neutralize acids that may be allowed to gradually generate. Specific examples of such a compound include compounds which are capable of generating base through heating. For example, it is possible to employ NBC-101 (trade name; Midori Kagaku Co., Ltd.), carbamate compounds such as α,α-dimethyl-3,5-dimethoxybenzyl carbamate.

It is also possible to preferably employ the compounds represented by the following general formulas (TBG1) to (TBG8) can be employed.

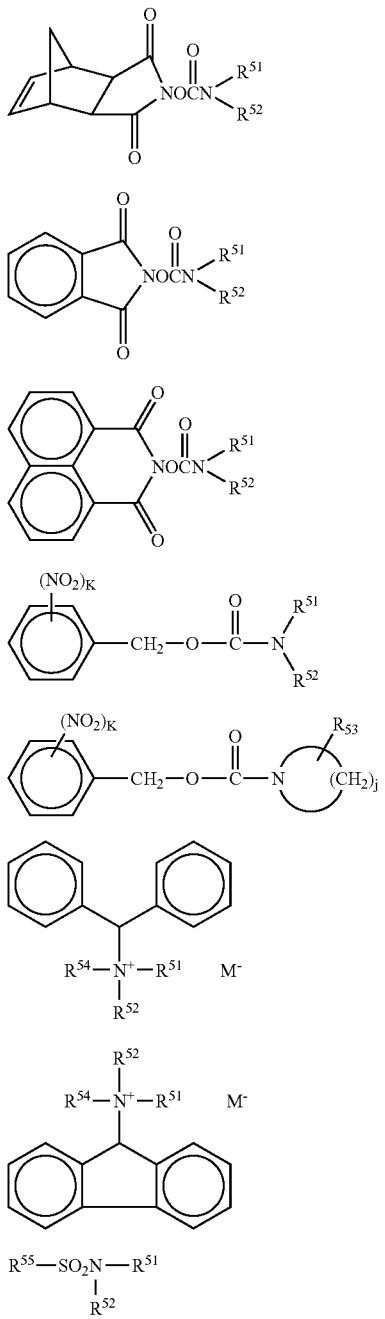

wherein $R^{51}$, $R^{52}$ and $R^{54}$ may be the same or different and are individually hydrogen atom, linear or branched alkyl group having 1 to 20 carbon atoms, or cyclic alkyl group having 3 to 20 carbon atoms, wherein a pair of $R^{51}$ and $R^{52}$, a pair of $R^{51}$ and $R^{54}$ and a pair of $R^{52}$ and $R^{54}$ may be combined with each other to form a cyclic structure; $R^{53}$ is linear or branched alkyl group having 1 to 4 carbon atoms; $R^{55}$ is hydrogen atom, linear or branched alkyl group having 1 to 20 carbon atoms, cyclic alkyl group having 3 to 20 carbon atoms, or aryl group having 6 to 20 carbon atoms; M is iodonium or sulfonium; j is an integer ranging from 2 to 10; k is an integer ranging from 1 to 3.

As for the linear or branched alkyl group having 1 to 20 carbon atoms, which can be introduced as $R^{51}$, $R^{52}$, $R^{54}$ and $R^{55}$, they may be selected from methyl, ethyl, n-propyl, isopropyl, n-butyl, tert-butyl and n-dodecyl. As for the cyclic alkyl group having 3 to 20 carbon atoms, it is possible to employ, for example, cyclopropyl, cyclobutyl, cyclopentyl, cyclohexyl, cycloheptyl, cyclooctyl or cyclododecyl. As for the aryl group having 6 to 20 carbon atoms, it is possible to employ phenyl, naphthyl or pyrenyl. As for the cyclic structure to be formed from the aforementioned pair of groups, it includes piperidino group, pyrrolidino group, propylene imino group and azetidino group.

As for the linear or branched alkyl group having 1 to 4 carbon atoms, which can be introduced as $R^{53}$, it may be selected from methyl, ethyl, n-propyl, isopropyl, n-butyl, tert-butyl, etc.

(Dispersing Agent, Surfactant, etc.)

In order to further enhance the dispersibility of pigment, etc., the inkjet ink according to the embodiments of the present invention may include a small quantity of dispersing agent such as a nonionic or ionic surfactant and an antistatic agent. High-molecular dispersing agents having almost the same properties as the aforementioned dispersing agents, such as acrylic polymer and polyvinyl alcohol, can be also suitably employed. However, when a cationic dispersing agent is employed as a dispersing agent, it is preferable to select a compound whose acidity is lower than that of carboxylic acid. The reason is that some kinds of cationic dispersing agents may promote the curing dark reaction of the ink. Further, those kinds of dispersing agents and dyes that exhibit strong basicity are undesirable as they not only deteriorate the sensitivity of ink but also promote the curing dark reaction occasionally. Therefore, the dispersing agents should preferably be selected from those exhibiting nearly neutrality or from nonionic dispersing agents.

(Radical Polymeric Monomers)

When a printing surface is highly basic, or when a pigment or a printing surface is liable to be affected by an acid, the influence of the acid can be minimized by the incorporation of a suitable radically polymerizable compound. As for the radically polymerizable compound, they include, for example, an acrylic monomer, a methacrylic monomer, a styrene monomer, and a compound having a plurality of vinyl-based polymerizable groups of these monomers.

The vinyl ether compound can be radically polymerizable singly or in combination with an acrylic monomer. Likewise, when a compound provided with radically polymerizable as well as cationically polymerizable properties, such as CEL2000(™, Daicel Chemical Industries., Ltd.), glycidyl methacrylate, and ester compounds to be derived from vinyl alcohols and acrylic acid, methacrylic acid, etc. is added to the ink, it would be possible to obtain advantages associated with both radical polymerizability and cationic polymerizability. In this case, a photoradical polymerization initiator such as Michler's ketone known as Irgar Cure™ and benzophenone, or a photocrosslinking type radical generating agent such as bisazide can be incorporated into the ink together with the aforementioned radically polymerizable compound. This technique may be employed also in a case where the ink layer is required to have excellent chemical resistance after the curing thereof.

(Other Kinds of Solvent)

The liquid ink according to the embodiments of the present invention should preferably be prepared so as not to include any volatile component such as water and organic solvents in general. However, organic solvents which are to be employed in the preparation of raw materials, such as methylethyl ketone, propylene glycol-based solvents, ethyl lactate and xylene may be contained therein in an unavoidable quantity. Further, if the inkjet recording apparatus is provided with a gas exhausting mechanism or a solvent recovery mechanism for instance, a little quantity of organic solvents may be contained in the solution for the purpose of obtaining desired printed matters. In this case, it is preferable, in safety viewpoint, to employ water, alcohols such as ethanol, propanol or petroleum components such as isoper and terpene.

In the foregoing explanations described above, the present invention has been explained in detail by referring to the specific examples of each component. Next, characteristics which are required commonly in all of inkjet inks will be explained.

When the alicyclic skeleton included in the aforementioned acid-polymerizable compounds is formed of terpenoid skeleton, it would preferably enhance the safety of inkjet ink or the ink layer after the curing thereof to human body as well as to the environments. Examples of such a structure include vinyl ether compounds wherein hydrogen atom of alcohols having the aforementioned skeleton is substituted by vinyl group, the vinyl ether compounds being formed of derivatives such as myrcene, ocimene, geraniol, nerol, linalol, citrorenol, citral, menthene, limonene, dipentene, terpinolene, terpinene, phellandrene, sylvestrene, piperithol, terpineol, menthenemonol, isopregol, perary aldehyde, piperitone, dihydrocarvone, carvone, pinol, ascaridole, sabinene, carene, pimene, bornene, fenchene, camphene, carveol, sesquiterpene, diterpene, triperpene, etc.

Alternatively, it is also possible to preferably employ alicyclic oxetane compounds wherein alcohols having the aforementioned skeleton is ether-linked, through dehydro-condensation, with the alcohols having an oxetane skeleton. On the other hand, vinyl ether compounds, epoxy compounds and oxetane compounds all having a norbornene skeleton, which can be abundantly found in natural environment, are advantageous in terms of cost and hence can be preferably employed.

Since the inkjet ink according to the embodiments of the present invention is a photosensitive ink which requires the application of heating, the volatility of ink should preferably be as low as possible in viewpoint of safety and odor. More specifically, the volatilizing rate of ink after the exposure thereof and at a temperature of 80° C. should preferably be confined to not higher than 0.2 mg/cm²·min. The quantity of volatilization herein is a quantity of volatilization (mg) per minute that will be generated when a vessel having an opening area of 10 cm² for instance is heated. Although this quantity of volatilization varies depending on the size of the opening of the vessel, this value is usually defined as a value that can be obtained when a Petri dish having a diameter of 6 cm and containing 4 g of ink therein is heated under the ordinary pressure. When the rate of volatilization becomes too large, the environmental safety would be deteriorated and at the same time, the problem of odor would become more severe. On the other hand, if the ink is formulated such that the volatility thereof is very poor, e.g. 0.00001 mg/cm²·min or less, the viscosity of the ink would become too high in general so that there is much possibility that the delivery of inkjet would become difficult.

As already explained, the inkjet ink according to the embodiments of the present invention should preferably be formulated so as to have a fluidity of at least 30 mPa·s at the ordinary temperatures. In order to enable the ink to have the aforementioned properties and when the ink contains "n" kinds of acid-polymerizable compounds including the aforementioned vinyl ether compounds, the viscosity $\eta_t$ represented by the following formula (A) should preferably be confined within the range of 3 (mPa·s) to 30 (mPa·s), more preferably 5 (mPa·s) to 25 (mPa·s).

$$\eta_t = \exp(\chi_1 \cdot \ln(\eta_1) + \chi_2 \cdot \ln(\eta_2) + \chi_3 \cdot \ln(\eta_3) + \ldots + \chi_n \cdot \ln(\eta_n)) \quad (A)$$

(wherein $\chi_1, \chi_2, \chi_3 \ldots \chi_n$ represent weight ratios of each of the components; and $\eta_1, \eta_2, \eta_3 \ldots \eta_n$ represent the viscosity of the individual component at the ordinary temperature and the ordinary pressure)

If the viscosity $\eta_t$ is failed to fall within this range, the delivery of ink may become very difficult or disturbance of image may be caused to occur due to irregular delivery of ink. Further, when the value of this $\eta_t$ is 12 mPa·s or less, the inkjet ink can be delivered without necessitating the heating of the head member, thus making the ink more preferable in the storage thereof or in minimizing the evaporation thereof from the head member.

Further, the inkjet ink according to the embodiments of the present invention may include, as part of the solvent, an epoxy compound or an oxetane compound having a solubility parameter of 19 MPa$^{1/2}$ or more. When these compounds are included in the inkjet ink, the properties related to the solubility of ink can be controlled to further enhance the stability of the ink. For example, by the inclusion of these compounds, it is now possible to obtain various effects such as the enhancement of solubility of a photo-acid generating agent, the enhancement of dispersibility of pigment employed as a coloring material, and still more, the enhancement of surface features of the ink. If the surface tension of ink is not appropriate under the conditions where the action of delivering the ink is affected such as surface tension, it has been required to incorporate a surfactant in the ink to adjust the value of surface tension. However, when a compound having a predetermined solubility parameter is incorporated in the ink, the addition of such a surfactant would not be required any longer.

Vinyl ether compounds can be easily dissolved in an acid-polymerizable compound having a solubility parameter of 19 MPa$^{1/2}$ or more, thereby making it possible to optionally set the solubility parameter of ink to a range which enables a stable delivery action of inkjet ink. This solubility parameter can be determined from the solubility to a material whose evaporation heat, surface tension and solubility parameter are already known. Specific examples of epoxy compounds and oxetane compounds useful in this case include C3000 (limonene dioxide; Daicel chemical Industries, Ltd.), OXT-221 (di[1-ethyl (3-oxetanyl)]methyl ether; Toa Gosei Co., Ltd.) and a compound having polyethylene oxide skeleton and oxetane group at a terminal thereof.

As already explained above, the image-forming capability of the inkjet ink according to the embodiments of the present invention depends largely on the chemical amplification mechanism. Namely, an acid generates from a photo-acid generating agent due to the exposure thereof, and the acid thus generated is diffused due to the heating thereof, thus enabling the acid to function as a catalyst for the crosslinking reaction. Therefore, in the case of the inkjet ink, the presence of basic ions in a great magnitude would become a cause for deteriorating the sensitivity of the ink. Therefore, attention should be paid so that the inkjet ink can be prevented from being contaminated by a large quantity of basic ions not only in the process of preparing the inkjet ink but also even in the process of manufacturing each of the constituent components.

The pigments to be employed in the inkjet ink according to the embodiments of the present invention may be further provided with other properties such as magnetism, fluorescence, conductivity, dielectric property, electromagnetic exothermic property, etc. in addition to the coloring and tinting properties. If the inkjet ink containing such a pigment provided with these various properties is employed, it may become possible to obtain a printed matter having various functions. Next, some of such examples will be explained.

At first, a case where the inkjet ink contain a pigment provided with magnetism will be explained.

First of all, an inkjet ink containing, as a pigment, powder provided with magnetism is prepared. This inkjet ink can be obtained by incorporating magnetic powder made of, for example, iron, cobalt, nickel, an alloy or oxide thereof into any of the aforementioned solvents together with a photo-acid generating agent and a high-molecular compound or powder which is capable of enhancing the dispersibility of ink.

Then, this inkjet ink is delivered onto a recording medium to draw a pattern such as a bar code pattern. After finishing the delivery of ink, light such as ultraviolet ray is immediately irradiated against the ink layer. The quantity of irradiation on this occasion may be determined depending on the mixing ratio of the pigment in the inkjet ink or on the sensitivity of the inkjet ink, the dosage of the irradiation being ordinary such that ranges from several hundreds mJ to one thousand and several hundreds mJ. Even immediately after the irradiation of light, the stickiness and fluidity of the ink layer would be varnished. However, the ink layer may be left to stand in a stocker at a temperature ranging from the ordinary temperature to 60° C., thus completely curing the ink layer. Since the ink layer cured in this manner is provided with magnetism, it is possible to read out a secondary information other than image information by a magnetism detecting mechanism such as a magnetic head.

Next, a case where the inkjet ink contains a conductive pigment will be explained.

First of all, an inkjet ink containing, as a pigment, powder provided with electric conductivity is prepared. This inkjet ink can be obtained by incorporating a conductive pigment selected from, for example, silver, gold, copper, aluminum, carbon, nickel, iron, cobalt, lead, tin, antimony, an alloy comprising an optional combination of these metals and a composite thereof with an organic material into any of the aforementioned solvents together with a photo-acid generating agent and a high-molecular compound or powder which is capable of enhancing the dispersibility of ink. Alternatively, for the purpose of reducing the content of resin component so as to enhance the electric conductivity of the ink layer that can be ultimately obtained, the mixing ratio of the polymeric compounds in the inkjet ink may be reduced and at the same time, an organic solvent may be incorporated into the inkjet ink.

Then, this inkjet ink is delivered onto a recording medium such as an insulating substrate to draw a pattern such as a wiring pattern. After finishing the delivery of ink, light such as ultraviolet ray is immediately irradiated against the ink layer. The quantity of irradiation on this occasion may be determined depending on the mixing ratio of the pigment in the inkjet ink or on the sensitivity of the inkjet ink, the dosage of the irradiation being ordinary such that ranges from several hundreds mJ to one thousand and several hundreds mJ. Even immediately after the irradiation of light, the stickiness and fluidity of the ink layer would be varnished. However, the ink layer may be left to stand in a stocker at a temperature ranging from the ordinary temperature to 60° C., thus completely curing the ink layer. The electric conductivity of the ink layer can be further enhanced by applying heat and pressure to the ink layer. Further, when alloy powder which is relatively low in melting point is employed as a conductive pigment, the ink layer may be heated up to a fluidizing temperature of the ink to obtain a conductive pattern. Since the printed pattern obtained in this manner is provided with electric conductivity, it is possible to employ the pattern as a circuit pattern or a resistor pattern.

Alternatively, when an inkjet ink containing, as a pigment, dielectric powder made of an alloy or oxide of barium, lead, bismuth, iridium, ruthenium, tantalum, platinum, titanium, strontium or chromium; or ceramic power is employed, it is possible to form a dielectric layer of capacitor or inductor. In this case, when the ink layer is sintered after it is formed into a pattern, it may become possible to enhance the property thereof. Further, when an inkjet ink containing a pigment provided with photocatalizing function or bactericidal action such as titanium oxide powder is employed, it is possible to form a printed pattern having such a function and action. As for the electromagnetic exothermic powder, it is possible to employ, for example, electromagnetic exothermic ceramics or silicone resin. This electromagnetic exothermic powder can be employed for the purpose of selectively heating a printed portion by electromagnetic wave. This powder can be employed for enhancing the electromagnetic heating property of all kinds of the inkjet ink according to the embodiments of the present invention.

Furthermore, by taking advantage of the techniques illustrated in these embodiments, it is possible to perform overlapped printing or to form a relatively thick printed pattern. More specifically, a step of delivering inkjet ink onto a predetermined region of a recording medium to obtain an ink layer and a step of curing the ink layer are repeated a plurality of times, thereby making it possible to form an image which has been partially corrected or an image having an embossed portion which can be tactilely recognized. For example, it is possible to form a printed pattern for the handicapped such as Braille, a printed pattern such as a topographic map where the thickness thereof is fluctuated in conformity with the contour lines, and a portion of device having a thickness of several tens μm or more.

The inkjet ink according the embodiments of the present invention can be applied to an inkjet recording apparatus shown in FIG. 1 for instance. The inkjet recording apparatus 1 shown in FIG. 1 is provided with a transferring mechanism 3 for transferring a recording medium 2. Along the running direction of the transferring mechanism 3, there are successively disposed, starting from the upstream side to the downstream side, an inkjet type recording head 4, a light source 5 and a heater 6 as a heating mechanism.

With respect to the recording medium (an printing matter or an article to which printing is applied) 2, there is not any particular limitation on the kinds thereof as long as printing can be performed on the recording medium 2. Namely, it is possible to employ, as the recording medium 2, various kinds of materials including paper, an OHP sheet, a resin film, non-woven fabric, a porous film, a plastic plate, a circuit board and a metallic substrate.

The transferring mechanism 3 is constructed so as to enable the recording medium 2 to pass through the recording head 4, the light source 5 and the front side of heater 6. In this case, the transferring mechanism 3 transfers the recording medium 2 from the right side to the left side in the drawing. This transferring mechanism 3 can be constituted for example by a belt and/or a roller for transferring the recording medium 2, and a driving mechanism for driving the belt and/or the roller. Further, this transferring mechanism 3 may be further provided with a guiding member for assisting the transfer of the recording medium 2.

The recording head 4 is configured so as to deliver an inkjet ink onto the recording medium 2 according to image signals, thereby forming an ink layer. As for the recording head 4, it is possible to employ a serial scanning type head mounted on a carriage or a line scanning type head having a width larger than that of the recording head 4. In viewpoint of achieving a high-speed printing, the latter is generally more advantageous as compared with the former. With respect to the method of delivering an inkjet ink from the recording head 4, there is not any particular limitation. For example, by using the pressure of vapor to be generated by the heat of a heating element, the droplets of ink can be ejected. Alternatively, by using a mechanical pressure pulse to be generated from a piezoelectric element, the droplets of ink can be ejected.

The light source 5 irradiates light to the ink layer formed on the recording medium 2, thus enabling acid to generate from the ink layer. As for the light source 5, it is possible to employ a mercury lamp such as a low, medium or high pressure mercury lamp; a tungsten lamp; an arc lamp; an excimer lamp; an excimer laser, a semiconductor laser; a YAG laser; a laser system constituted by a combination of laser and non-linear optical crystal; a high-frequency induction type ultraviolets generating apparatus; an electron beam irradiating apparatus; an X-ray irradiating apparatus; etc. Among them, the employment of the high-frequency induction type ultraviolets generating apparatus and the high/low pressure mercury lamp or the semiconductor laser would be more preferable, since these devices are advantageous in simplifying the system involved. The light source 5 may be provided with a converging mirror or a sweep optical system.

The heater 6 employed as a heating mechanism heat the ink layer formed on the recording medium 2, thus promoting the crosslinking reaction using an acid as a catalyst. Although it is possible to enable the inkjet ink according to the embodiments of the present invention to cure without necessitating the application of heat after the exposure thereof, it is desirable perform the heating of the ink for enabling the ink to cure more quickly. As for this heater 6, it is possible to employ an infrared lamp; a roller (heat roller) housing therein a heating element; a blower for ejecting hot air or heated air; etc.

By using the aforementioned apparatus 1, the printing to the recording medium can be performed by the following method.

First of all, by the transferring mechanism 3, the recording medium 2 is transferred from the right side to the left side in the drawing. The transferring speed of the recording medium 2 may be confined for example within the range of 0.1 m/min to 100 m/min.

As the recording medium 2 is transferred up to a location in front of the recording head 4, the aforementioned inkjet ink is delivered from the recording head 4 according to the image signals. As a result, a prescribed ink layer (not shown) is formed on the recording medium 2.

Then, the recording medium 2 having the ink layer formed thereon is transferred to a location in front of the light source 5. At the moment when the recording medium 2 passes through a location in front of the light source 5, light is irradiated from the light source 5 to the ink layer formed on the recording medium 2, thereby enabling an acid to generate in the ink layer. Incidentally, the intensity of irradiated beam at the surface of ink layer may be confined generally within the range of several $mW/cm^2$ to 1 $KW/cm^2$ though this range may be varied depending on the wavelength of the light source to be employed. The quantity of exposure to the ink layer can be optionally determined depending on the sensitivity of inkjet ink or on the transferring speed of the printing matter (i.e. the transferring speed of the recording medium 2).

Thereafter, the recording medium 2 is transferred to the interior of or in the vicinity of the heater 6. At the moment when the recording medium 2 passes through the interior of or in the vicinity of the heater 6, the ink layer formed on the recording medium 2 is heated by the heater 6 to promote the crosslinking reaction in the ink layer. Incidentally, in the apparatus shown in FIG. 1, the heating time by the heater 6 is generally relatively short, i.e. ranging from several seconds to several tens seconds. Accordingly, if it is desired that the curing of the ink layer is substantially completely accomplished by the heater 6, the heating should be performed with the maximum ultimate temperature being controlled to become relatively high, i.e. 200° C. or less, more preferably within the range of 80° C. to 200° C., most preferably within the range of about 60° C. to 180° C.

Subsequently, the recording medium 2 is transferred to the interior of stocker (or vessel) (not shown), thus finishing the printing.

The heating means for heating the ink layer may not be restricted to the heater 6 which is disposed at a downstream side of the light source as shown in FIG. 1. For example, the light source 5 may be utilized as a heating source by moving the light source 5 close to recording medium 2 on the occasion of irradiating light to the ink layer while taking care so as not to damage the printing surface. Likewise, it is also possible to utilize the light source as a heating source by omitting the provision of a heat-dissipating mechanism such as a cold mirror. When a high-output bulb of several hundreds watts is employed as a light source, a cooling mechanism which must be provided together with the light source can be modified so as to intentionally return the waste heat to the surface of printing paper. More specifically, part of the waste heat mechanism of the cooling mechanism is modified so as to provide a mechanism which makes it possible to return the waste heat to the printing paper as described above. By the provision of such a mechanism, the ink layer can be heated by using heat to be generated from the light source.

For example, by reintroducing an air flow which has been utilized for cooling the light source onto the surface of printing paper or into the interior of transferring/sustaining mechanism, it will be possible to obtain a mechanism which corresponds to a light source having an output of not less than one hundred watts and provided with a heating mechanism. The ultimate temperature of the recording medium that can be realized through the recirculation of heat of the light source may be such that makes it possible to obtain the same degree of effect as obtainable from the heating by the aforementioned heater. Although it depends on the heating time, a preferable range of temperature may be generally at least 60° C. or more, more preferably within the range of 80° C. to 100° C. When the speed of exposure is relatively high, e.g. several meters/sec., the ultimate temperature may be as high as 180° C. or so since the recording medium will be heated instantaneously.

When a light source which is capable of generating infrared ray in addition to the visible light is employed as the light source 5 for instance, the irradiation of light and the heating to the recording medium can be concurrently performed. The employment of such a light source is preferable since it will promote the curing of ink layer.

Since the ink layer is heated also from the heat to be generated from the light source 5 as the ink layer is irradiated with light, the heating mechanism may not necessarily be installed as an independent member as in the case of the heater 6. However, if only the heat from the light source 5 is utilized for heating the ink layer and then the heated ink layer is left to stand at the ordinary temperature for completely curing the ink layer, it will take a long time. Therefore, the standing of ink layer at the ordinary temperature should preferably be applied to when sufficiently a long period of time can be secured for complete curing of the ink layer. For example, in the case of the printed matters such as newspaper which will be distributed next day, it is possible to secure such a long time as about a whole day and night for allowing the ink layer to cure, and therefore it is possible to completely cure the ink layer even if the ink layer is left to stand at the ordinary temperature.

Figure 2:
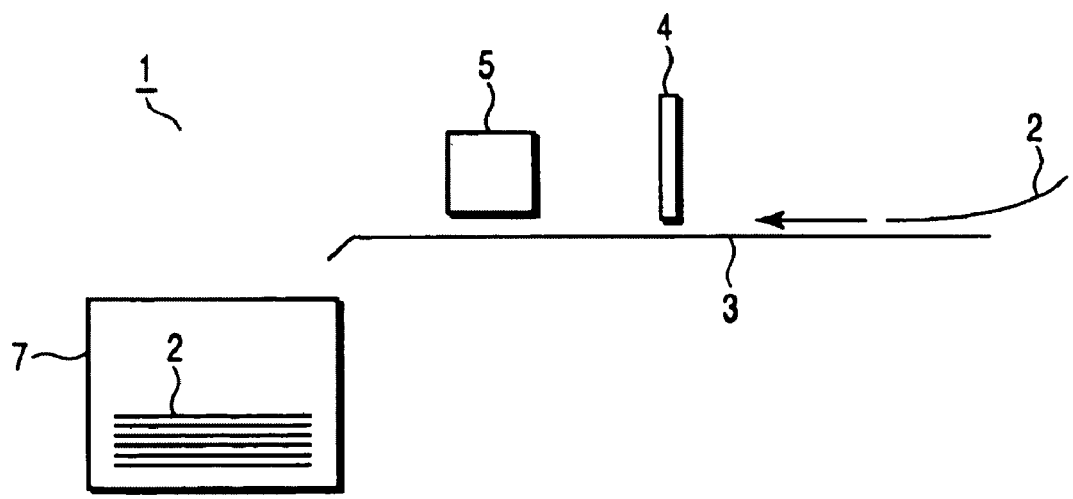
FIG. 2 is a schematic view of a recording apparatus making it possible to employ an inkjet ink according to another embodiment of the present invention.

The inkjet ink according to the embodiments of the present invention can be also applied to the inkjet recording apparatus shown in FIG. 2. The inkjet recording apparatus 1 shown in FIG. 2 is constructed in the same manner as the inkjet recording apparatus shown in FIG. 1 except that the stocker 7 is provided therein with a heater.

The stocker 7 accommodates a plurality of recording medium 2 that have been finished the exposure. This stocker 7 is capable of keeping the recording medium 2 after exposure at a temperature of about 40° C. or more, preferably within the range of about 50° C. to 120° C., more preferably within the range of about 60° C. to 100° C. or about 50° C. to 80° C. for a predetermined period of time.

In the case of the apparatus 1 shown in FIG. 1, since the heater 6 is disposed in a midway of the transferring route of the recording medium 2, it would not be easy to heat individual recording medium 2 for a long period of time. Whereas, in the case of the apparatus 1 shown in FIG. 2, since the heater is disposed inside the stocker 7, it is possible to heat individual recording medium 2 for a long period of time. Moreover, since a plurality of recording medium 2 can be heated collectively in the interior of the stocker 7, it would be advantageous in viewpoint of saving the power consumption. Furthermore, since individual recording medium 2 can be heated for a long period of time, it is now possible to obtain the following advantages.

Namely, depending on the combination between the recording medium 2 and the inkjet ink to be employed, refluidization may take place as the recording medium 2 is heated at a high temperature for a short period of time, thereby possibly deteriorating the quality of the printed image. Since this deterioration in quality of the printed image is caused due to the refluidization at a high temperature, this deterioration in quality of the printed image can be prevented by performing the heating of the ink layer at a relatively low temperature for a long period of time. For example, when the recording medium 2 after the exposure thereof is permitted to stand inside the stocker 7 for several minutes at a temperature ranging from about 50° C. to 80° C., the ink layer can be substantially completely cured without inviting the deterioration in quality of the printed image.

Preferably, the stocker 7 should be provided with a discharging mechanism for allowing the recording medium 2 that has been kept in a heated state for a predetermined period of time to successively move out of the stocker 7. The retention time for heating can be determined depending on the kinds of inkjet ink to be employed as well as on the heating temperature. For example, when the heating temperature is set to the range of 50° C. to 100° C., the retention time for heating may be set to the range of about 0.5 minute to 10 minutes. When the heating is performed without heater, the retention time for heating may be several hours.

The heater 6 shown in FIG. 1 may be additionally disposed on the upstream side of the stocker 7. If the degree of curing of the ink layer is not sufficient enough in the process of transferring the recording medium 2 up to the interior of the stocker 7, there is a possibility of generating the collapse of image due to the impingement among the recording medium 2 in the interior of the stocker 7. Therefore, if the ink layer is preliminarily heated by the heater 6, the recording medium 2 can be individually heated prior to the introduction thereof into the stocker 7, thus making it possible to prevent the generation of such a collapse of image.

As described above, when the inkjet ink according to the embodiments of the present invention is employed, the ink layer can be rapidly non-fluidized by the application of irradiation of light and heating after finishing the delivery of ink onto printing matter. Namely, it is possible to obtain a printed matter of high quality without necessitating a large scale exposure system. Incidentally, the non-fluidized film thus obtained should preferably be thermoplastic (i.e. it can be refluidized by the application of heat, so that there is no problem even if the retention time of this plasticity may be relatively short).

Moreover, in different from the conventional inkjet ink utilizing radical polymerization, it is not required, in the case of this inkjet ink, to employ a carcinogenic radical-generating agent or a radical polymeric monomer which is highly stimulating to skin and badly smelling. Therefore, the inkjet ink according to the embodiments of the present invention can be handled quite easily.

Further, in the case of the inkjet ink according to the embodiments of the present invention, typically, almost all of the solvents are constituted by acid-polymerizable compounds. When the ratio of the polymeric compounds in the inkjet ink to the entire volume of solvents is sufficiently high, there is little possibility of causing organic solvent to volatilize on the occasion of printing. Therefore, it is now possible to obviate the problem of environmental contamination that may occur due to the evaporation of organic solvents, thus unnecessitating the provision of an exhaust installation or a solvent recovery mechanism.

Since the employment of organic solvent is no longer required and at the same time, the ink layer can be rapidly non-fluidized, it is now possible to easily fix a printed image without substantially generating bleeding on the printing surface of various different characteristics. Additionally, there is little possibility of the deterioration of printed surface which may otherwise occur due to the drying of the ink layer. Moreover, according to the inkjet ink of the embodiments of the present invention, since it is possible to incorporate pigment as a color component at a high concentration, it is now possible to form a printed pattern which is clear and excellent in weather resistance.

Next, the present invention will be further explained in detail with reference to specific examples.

Incidentally, the vinyl ether compounds to be set forth below are identical in meaning with the compounds represented by the general formula (1).

First of all, as acid-polymerizable compounds, vinyl ether compounds represented by the following chemical formulas were prepared.

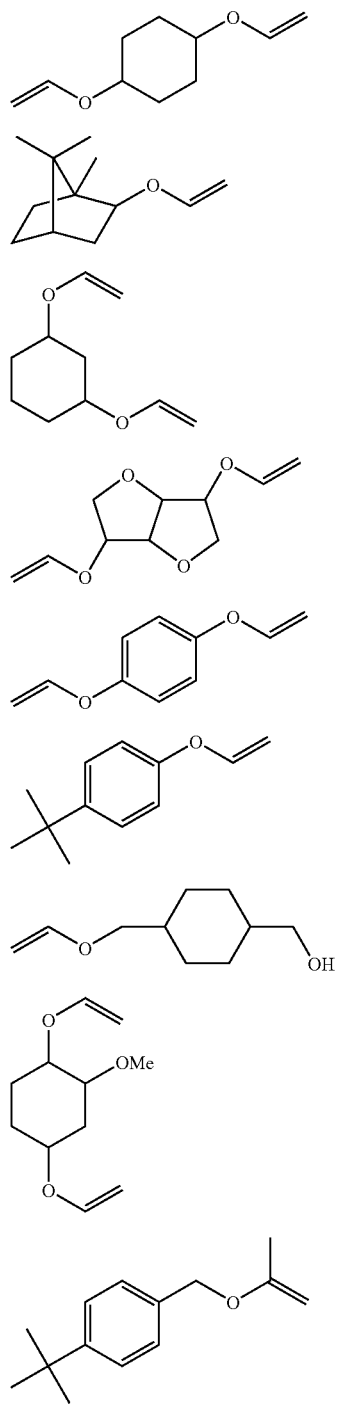

4CHDV

IBVE 1,3CH-DVE

ISB-DVE

HQDV

TBP-VE

CHMVE

M-CHDV

TBMP-IP

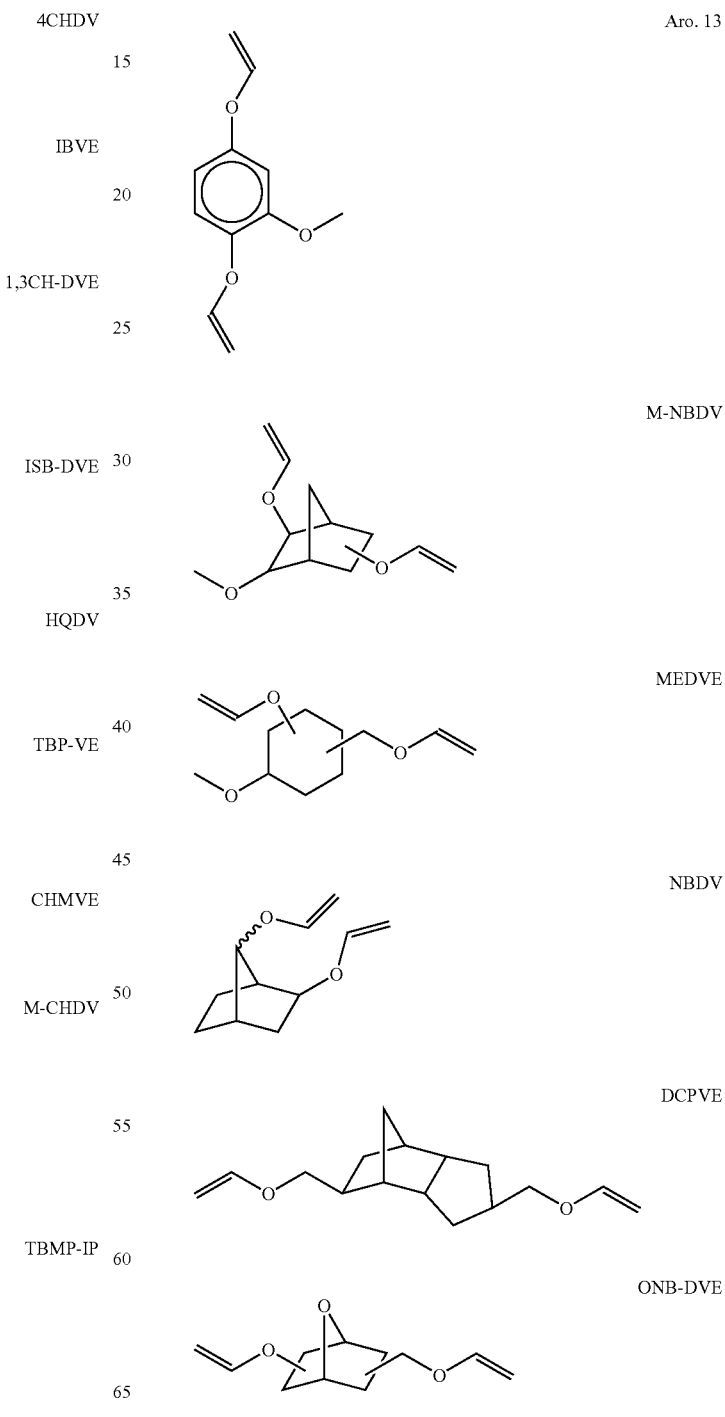

Aro. 14

Aro. 13

M-NBDV

MEDVE

NBDV

DCPVE

ONB-DVE

-continued

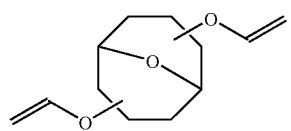
OCN-DVE

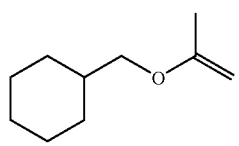
CHM-IP

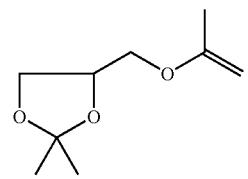
DOM-IP

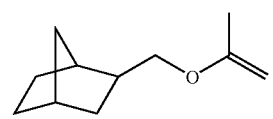
NBM-IP

These vinyl ether compounds were employed according to the recipe shown in the following Tables 1 and 2 to obtain Solvents A1-A13, B1-B18, C1-C6 and D1.

TABLE 1

| Solvents | Vinyl ether compounds (part by weight) | Epoxy compound (part by weight) | Oxetane compounds (part by weight) | Propylene carbonate (part by weight) | Ink No. |
|---|---|---|---|---|---|
| A1  | HQDV (100)      |                                   |              |         | 1  |
| A2  | 4CHDV (100)     |                                   |              |         | 2  |
| A3  | 1,3CH-DVE(100)  |                                   |              |         | 3  |
| A4  | IBVE (100)      |                                   |              |         | 4  |
| A5  | ISB-DVE(100)    |                                   |              |         | 5  |
| A6  | CHMVE(100)      |                                   |              |         | 6  |
| A7  | 4CHDV (50)      | SR-NPG(50)                        |              |         | 7  |
| A8  | TBP-VE(50)      |                                   | OXT221(50)   |         | 8  |
| A9  | HQDV (50)       |                                   | OXT221(50)   |         | 9  |
| A10 | 4CHDV (50)      |                                   | OXT221(50)   |         | 10 |
| A11 | 4CHDV (90)      |                                   |              | PC(10)  | 11 |
| A12 | 4CHDV (50)      | Solubility parameter 20 or more (50) |           |         | 12 |
| A13 | 4CHDV (60)      | Viscosity 500 mPa · s or more(40) |              |         | 13 |
| A14 | IBA(50)         | TPGDA(25)                         | TMPETA(15)   |         | 14 |
| A15 | DEGV(100)       |                                   |              |         | 15 |
| A16 | C3000(100)      |                                   |              |         | 33 |
| B1  | ONB-DVE(100)    |                                   |              |         | 34 |
| B2  | OCN-DVE(100)    |                                   |              |         | 35 |
| B3  | M-CHDV(100)     |                                   |              |         | 36 |
| B4  | MEDVE(100)      |                                   |              |         | 37 |
| B5  | M-NBDV(100)     |                                   |              |         | 38 |
| B6  | NBDV(100)       |                                   |              |         | 39 |
| B7  | ISB-DVE(80) M-CHDV(20) |                            |              |         | 40 |
| B8  | ISB-DVE(80) MEDVE(20)  |                            |              |         | 41 |
| B9  | ONB-DVE(80) M-CHDV(20) |                            |              |         | 42 |
| B10 | ONB-DVE(80) MEDVE(20)  |                            |              |         | 43 |
| B11 | ISB-DVE(80)     | SR-NPG(20)                        |              |         | 44 |
| B12 | ISB-DVE(80)     |                                   | OXT221(20)   |         | 45 |
| B13 | ONB-DVE(80)     | SR-NPG(20)                        |              |         | 46 |
| B14 | ONB-DVE(80)     |                                   | OXT221(20)   |         | 47 |
| B15 | ISB-DVE(80)     | C3000(20)                         |              |         | 48 |
| B16 | ISB-DVE(80)     | C2021(20)                         |              |         | 49 |
| B17 | ONB-DVE(80)     | C3000(20)                         |              |         | 50 |
| B18 | ONB-DVE(80)     | C2021(20)                         |              |         | 51 |

TABLE 2

| Solvents | Vinyl ether compounds (part by weight) | Epoxy compound (part by weight) | Oxetane compounds (part by weight) | Propylene carbonate (part by weight) | Ink No. |
|---|---|---|---|---|---|
| C1 | TBMP-IP(60) ONB-DVE(40) | | | | 52 |
| C2 | CHM-IP (40) ONB-DVE(60) | | | | 53 |

TABLE 2-continued

| Solvents | Vinyl ether compounds (part by weight) | Epoxy compound (part by weight) | Oxetane compounds (part by weight) | Propylene carbonate (part by weight) | Ink No. |
|---|---|---|---|---|---|
| C3 | DOM-IP(40) ONB-DVE(60) | | | | 54 |
| C4 | NBM-IP(40) ONB-DVE(60) | | | | 55 |
| C5 | Formula Aro. 13(60) ONB-DVE(40) | | | | 56 |
| C6 | Formula Aro. 14(60) ONB-DVE(40) | | | | 57 |
| D1 | DCPVE(60) 4CHDV(40) | | | | 58 |

The vinyl ethers shown in above Tables represent the following compounds.

HQDV: p-vinyloxy benzene
4CHDV: 1,4-cyclohexanediol divinylether
1,3CHDVE: 1,3-cyclohexanediol divinylether
IBVE: isoborneol vinylether
CHMVE: 1,4-cyclohexanedimethanol vinylether
TBP-VE: 1-tert-butyl-4-vinyloxy benzene
M-CHDV: 2-methoxy-1,4-cyclohexanediol divinylether
MEDVE: methoxy-vinyloxy-cyclohexanemethanol vinylether
M-NBDV: methoxynorbornane vinylether
ISB-DVE: isosorbite divinylether
ONB-DVE: hydroxymethyl-hydroxyoxanorbornanediol divinylether
OCN-DVE: oxabicyclononane divinylether
NBDV: norbornane divinylether
TBMP-IP: t-butylbenzylalcohol isopropenyl
CHM-IP: cyclohexanemethanol isopropenyl
DOM-IP: dioxoranemethanol isopropenyl
NBM-IP: norbornanemethanol isopropenyl
DCPVE: DCP dimethanol divinylether In above Table 1, SR-NPG represents diglycidyl ether having a neopentyl skeleton (Sakamoto Yakuhin Co., Ltd.), OXT-221 represents an oxetane compound (Toa Gosei Co., Ltd.), C3000 represents limonene dioxide (Daicel chemical Industries, Ltd.), and DEGV represents diethyleneglycol monovinyl ether (Maruzen Petrochemicals Co., Ltd.).

To each of the solvents A1 to A13, carbon black (5% by weight) as a pigment, and UVACURE1591 (8% by weight) as a photo-acid generating agent were added to obtain a mixture which was then subjected to dispersion treatment a whole day and night by using a paint shaker. The mixture that had been subjected to this dispersion treatment was filtered by using a 5 μm PTFE filter to obtain inkjet inks (Nos. 1-13).

Incidentally, carbon black was kneaded together with acrylic resin-based dispersing agent in advance to prepare a mill base, to which 200 ppm of a nonionic surfactant (Sumitomo 3M Co., Ltd.) and a dispersing agent available in the market (Ajisper trade name; Ajinomoto Fine Techno Co., Ltd.) were added to obtain inkjet inks (Nos. 1-13). Since these inkjet inks were all formulated such that not less than 40% by weight of the acid-polymerizable compounds was constituted by a vinyl ether compound having a cyclic skeleton, these inks were all considered to belong to the inkjet inks according to the embodiments of the present invention. Further, in the same manner as in the case of the inks of Nos. 1-13, the inks of Nos. 34-58 were prepared.

For the purpose of comparison, various photo-radical generating type inkjet ink were prepared. First of all, 50 parts by weight of isobornyl acrylate (IBA), 25 parts by weight of tripropylene glycol diacrylate (TPGDA) and 25 parts by weight of trimethylolpropane ethoxylate triacrylate (TMPETA) were mixed together to prepare a solvent. To this solvent, 5 parts by weight of Ilgacue (trade name) (NO.2959; Nagase Sangyo Co., Ltd.), 5 parts by weight of carbon black pigment, a minute amount of acrylic dispersing agent and a surfactant were added to obtain a mixture. This resultant mixture was then subjected to dispersion treatment for 5 hours by using a homogenizer. This dispersed mixture was then filtered by using a 5 μm PTFE filter to obtain a photo-radical generating type inkjet ink, thus forming No. 14 inkjet ink.

Additionally, a vinyl ether compound of non-cyclic skeleton (DEGV) and C3000 were respectively employed as a solvent and carbon black pigment was mixed as a color component with each of the solvents to prepare No. 15 inkjet ink and No. 33 inkjet ink.

Since these inks of No. 14, No. 15 and No. 33 were formulated such that the vinyl ether compound having a cyclic skeleton was not included therein, they were considered as inks of comparative examples.

The properties of the inkjet inks thus obtained were evaluated by using an inkjet recording apparatus shown in FIG. 1. As for the recording medium 2, an ordinary enameled paper was employed, and as for the light source 5, an ultra-high pressure mercury lamp having an output of 230 W was employed. Further, without employing a heater as a heating means 6, only the irradiation of ultraviolet ray was tried to cure an ink layer. Under these conditions, the inkjet recording was performed to investigate the pencil hardness, printing quality and solvent resistance of the cured ink layer as well as the adhesion of ink layer to the recording medium.

Incidentally, the results of the pencil hardness shown in the following tables were obtained by measuring the ink layer under the following conditions.

Immediately after exposure: The ink layer immediately after exposure;

Stocker: The ink layer which was left to stand for 3 minutes inside the stocker at a temperature of 80° C. after the exposure thereof;

Left standing at ordinary temperature: The ink layer which was left to stand for 8 hours at the ordinary temperature (25° C.) after the exposure thereof.

The quality of printing was evaluated by visually observing the printed image, and the printed image which was free from missing therein was defined as "good", and the printed image accompanying several portions of missing was defined as "defective".

The solvent resistance was evaluated as follows after performing an abrasiveness test using a sheet of cloth impregnated with an organic solvent such as ethanol, acetone, etc.

A (very good): Nothing was changed;
B (good): Ink was adhered onto the cloth;
C (more or less defective): The color of ink layer became thinner;
D (defective): Part of the ink layer was completely peeled away.

The adhesion was evaluated by performing a crosscut tape peeling test. Namely, when the area peeled of the ink layer is less than 10% based on the entire area of the ink layer was defined as good, and when this peeled area is not less than 10% based on the entire area of the ink layer was defined as defective.

First of all, the influence of the content of the vinyl compounds in the acid-polymerizable compounds on the properties of ink was investigated. Various inks were prepared according to the same recipe as that of No. 2 inkjet ink shown in above Table 1 except that, as part of the acid-polymerizable compounds, an epoxy compound (C3000) was incorporated at a predetermined ratio into the ink. The inks thus obtained were applied to the recording apparatus shown in FIG. 1 to investigate the pencil hardness and solvent resistance of the cured ink layer.

Likewise, various inks were prepared according to the same recipe as that of No. 45 inkjet ink or of No. 46 inkjet ink shown in above Table 1 except that, as part of the acid-polymerizable compounds, an oxetane compound (OXT221) and an epoxy compound (SR-NPG) were incorporated at a predetermined ratio into the ink.

The results obtained are summarized in the following Tables 3 to 5 together with the content of the vinyl ether (VE) compound.

TABLE 3

| | Content of VE (part by weight) | | | | | | | |
|---|---|---|---|---|---|---|---|---|
| | 10 | 20 | 30 | 35 | 40 | 50 | 60 | 100 |
| Pencil hardness | F | F | F | F | H | H | 2H | 2H |
| Exposure (mJ/cm$^2$) | 300 | 300 | 300 | 300 | 250 | 250 | 250 | 250 |
| Solvent resistance | More or less defective | More or less defective | More or less defective | Good | Very good | Very good | Very good | Very good |

TABLE 4

| | Content of VE (part by weight) | | | | | | | |
|---|---|---|---|---|---|---|---|---|
| | 0 | 5 | 10 | 20 | 30 | 40 | 50 | 60 |
| Pencil hardness | HB | HB | F | F | F | H | H | 2H |
| Exposure (mJ/cm$^2$) | 400 | 270 | 260 | 260 | 260 | 250 | 250 | 250 |
| Solvent resistance | More or less defective | Good | Good | Good | Good | Good | Good | Good |

TABLE 5

| | Content of VE (part by weight) | | | | | | | |
|---|---|---|---|---|---|---|---|---|
| | 0 | 5 | 10 | 20 | 30 | 40 | 50 | 60 |
| Pencil hardness | 2B | HB | F | F | F | H | H | H |
| Exposure (mJ/cm$^2$) | 500 | 280 | 270 | 270 | 270 | 260 | 260 | 260 |
| Solvent resistance | Defective | Good | Good | Good | Good | Good | Good | Good |

As shown in above Tables 4 and 5, it was confirmed that even if a little amount of a vinyl ether compound having a cyclic skeleton was incorporated into a solution of ink, it was possible to prominently enhance the photosensitivity of ink, and it was also effective in enhancing the solvent resistance of the ink. Further, as shown in above Tables 3, 4 and 5, it was also confirmed that when a vinyl ether compound having a cyclic skeleton was incorporated into a solution of ink at a ratio of 40% by weight of the acid-polymerizable compounds, it was possible to prominently enhance the photosensitivity of ink, and the solvent resistance of the cured ink layer thus formed was also excellent. Even if the cured ink layer was subjected to rubbing using a sheet of cloth impregnated with an organic solvent such as ethanol, acetone, any change was not recognized in the cured ink layer, thus confirming that the cured ink layer was excellent in solvent resistance.

Furthermore, by using the inkjet inks, the recording of images on a recording medium such as an OHP sheet was performed to investigate the curing of ink. As a result, it was confirmed that, when inkjet inks according to the embodiments of the present invention were employed, it was possible to form a cured ink film excellent in adhesive strength.

The following Table 6 illustrates the results wherein the properties of the inkjet inks of No. 2, No. 14 and No. 33 were compared with each other.

hardness even if only the irradiation of ultraviolet ray was employed for the curing, and that No. 2 ink was very excellent in quick-drying property.

TABLE 6

| Ink No. | Exposure (mJ/cm$^2$) | Pencil hardness | | | Printing quality | Solvent resistance | Adhesion |
| --- | --- | --- | --- | --- | --- | --- | --- |
| | | After exposure | Stocker | Standing at normal temp. | | | |
| 2 | 250 | H | 2H | 2H | Good | Good | Good |
| 14 | 1750 | Un-cured | Un-cured | Un-cured | Defective | Defective | Defective |
| 33 | 250 | HB | F | F | Good | More or less defective | Good |

As shown in above Table 6, No. 2 inkjet ink according to one embodiment of the present invention was capable of exhibiting a pencil hardness of H or more immediately after the exposure thereof even it was irradiated with light at an exposure quantity of as very low as 250 mJ/cm$^2$. Moreover, the cured ink layer thus obtained was also excellent in all of printing quality, solvent resistance and adhesion to recording medium.

Whereas, in the case of No. 14 ink which was photoradical generating type, even if it was irradiated with light by increasing the exposure dosage up to 1750 mJ/cm$^2$, and at the same time, the resultant ink layer was heated in the stocker, it was impossible to cure the ink layer. Further, in order to enable the ink layer to cure at an exposure dosage of 1000 mJ/cm$^2$, the concentration of the pigment in the inkjet ink was required to be decreased to 3% by weight of the ink. The pencil hardness of the ink layer on this occasion was at most HB and the printed image obtained was weak in color and strong in gloss of resin, thus making it unsuitable for practical use.

In the case of No. 33 ink containing only an epoxy resin as an acid-polymerizable compound, even if it was possible to achieve a pencil hardness of HB at an exposure dosage of 250 mJ/cm$^2$, it was impossible to achieve a pencil hardness of H as in the case of No. 2 inkjet ink. Further, the printed image thus obtained was slightly glossy even if the image itself was good.

It was confirmed through the comparison among these inkjet inks that No. 2 ink according to one embodiment of the present invention was capable of achieving a high The following Table 7 illustrates the results wherein the properties of the inkjet inks of No. 2 and No. 15 were compared with each other.

TABLE 7

| Ink No. | Exposure (mJ/cm$^2$) | Pencil hardness | | | Printing quality | Solvent resistance | Adhesion |
| --- | --- | --- | --- | --- | --- | --- | --- |
| | | After exposure | Stocker | Standing at normal temp. | | | |
| 2 | 250 | H | 2H | 2H | Good | Good | Good |
| 15 | 400 | B | HB | HB | Good | Defective | Defective |

In No. 2 inkjet ink, the acid-polymerizable compound was constituted by a vinyl ether compound having an alicyclic skeleton (4CHDV), and in No. 15 inkjet ink on the other hand, the acid-polymerizable compound was constituted by a vinyl ether compound having a chain skeleton (DEGV).

As shown in above Table 7, No. 2 inkjet ink was capable of being cured at an exposure dosage which was lower than that employed in No. 15 inkjet ink by about 150 mJ/cm$^2$ and moreover, the cured ink layer obtained therefrom was also excellent in solvent resistance and adhesion to recording medium. This preferable trend was also confirmed in the cases wherein the inks were prepared using vinyl compounds having other alicyclic skeleton as an acid-polymerizable compound. Therefore, it has been found out that when these vinyl compounds were employed for the preparation of an inkjet ink, it is possible to obtain an ink very excellent in curability.

Based on these results described above, it has been determined that at least 40% by weight of acid-polymerizable compounds should be constituted by a vinyl compound having a cyclic skeleton in the embodiments of the present invention. In the followings, the results investigated of the influence of the cyclic skeleton are illustrated.

The following Table 8 illustrates the results wherein the properties of the inkjet inks of No. 1 and No. 2 were compared with each other.

TABLE 8

| Ink No. | Exposure (mJ/cm$^2$) | Pencil hardness | | | Printing quality | Solvent resistance | Adhesion |
|---|---|---|---|---|---|---|---|
| | | After exposure | Stocker | Standing at normal temp. | | | |
| 1 | 250 | H | 2H | 2H | Good | Very good | Good |
| 2 | 250 | H | 2H | 2H | Good | Good | Good |

In No. 1 inkjet ink, the vinyl ether compound employed therein was provided with aromatic ring skeleton (benzene ring) as a cyclic skeleton, and in No. 2 inkjet ink on the other hand, the vinyl ether compound employed therein was provided with an alicyclic skeleton (cyclohexane ring) as a cyclic skeleton. As compared with No. 2 inkjet ink, No. 1 inkjet ink was capable of being cured at almost the same exposure dosage as that of No. 2 inkjet ink, and the hardness and adhesion of the cured ink layer to be achieved by the employment of No. 1 inkjet ink were almost the same as those of No. 2 inkjet ink. It will be also found from the results of above Table 8 that No. 1 inkjet ink was very excellent in solvent resistance. The reason for this was found due to the characteristics of ink using a vinyl ether compound having an aromatic ring skeleton, which is highly resistive to various chemicals including oily hydrocarbon solvents such as ethanol and acetone, and ester-based solvents.

The following Table 9 illustrates the results wherein the properties of the inkjet inks of No. 4 and No. 5 were compared with each other.

TABLE 9

| Ink No. | Exposure (mJ/cm$^2$) | Pencil hardness | | | Solvent resistance | Adhesion |
|---|---|---|---|---|---|---|
| | | After exposure | Stocker | Standing at normal temp. | | |
| 4 | 250 | F | H | H | Good | Good |
| 5 | 250 | F | H | H | Good | Good |

In No. 4 inkjet ink, the vinyl ether compound (IBVE) employed therein was provided with a cyclic skeleton containing no oxygen atom as a ring-constituting atom, and in No. 5 inkjet ink on the other hand, the vinyl ether compound (ISB-DVE) employed therein was provided with a cyclic skeleton containing oxygen atom as a ring-constituting atom. Due to this difference in ring structure, ISB-DVE was capable of exhibiting an extremely high polarity as compared with IBVE.

It will be seen from the results shown in FIG. 9 that there was little difference in curing property between No. 4 inkjet ink and No. 5 inkjet ink. However, when an image was formed on a recording medium exhibiting a relatively high polarity such as a PET film, a phenomenon was recognized that there was a substantial difference in wettability between them. Specifically, in the case of No. 4 inkjet ink, there was recognized a phenomenon of bleeding where droplets of ink exhibiting poor wettability to a recording medium were repelled, thus deteriorating the quality of printed image as compared with No. 5 inkjet ink. This difference can be attributed to a difference in polarity between these vinyl ether compounds.

Next, the mixing ratio between IBVE and ISB-DVE was variously altered in the preparation of inkjet inks, which were then employed for forming images on a PET film. The quality of images thus obtained was compared with other, the results being illustrated in the following Table 10.

TABLE 10

| | IBVE:ISB-DVE | | |
|---|---|---|---|
| | 10:1 | 8:2 | 6:4 |
| Image quality (bleeding) | Yes | Slight bleeding | None |

As shown in above Table 10, it was possible, due to the incorporation of ISB-DVE, to improve the wettability of the ink and to enhance the quality of printed image. As long as a vinyl ether compound is provided with a cyclic skeleton containing hydrogen atom as a ring-constituting atom, the vinyl ether is enabled to have the same degree of high polarity as that of ISB-DVE, so that the vinyl ether is enabled to have the similar properties as those of ISB-DVE. Accordingly, it was confirmed that it was possible, through the employment of such a vinyl ether compound, to control the wettability thereof to recording medium without deteriorating the curing property of ink and hence the employment of such a vinyl ether compound is quite useful as a solvent for inkjet ink.

The following Table 11 illustrates the results wherein the curing characteristics of the inkjet inks of No. 2 and No. 11 were compared with each other. No. 11 ink was formed of the same composition as that of No. 2 ink except that propylene carbonate was incorporated therein at a ratio of 10% by weight of the acid-polymerizable compounds.

TABLE 11

| Ink No. | Exposure (mJ/cm$^2$) | Pencil hardness | | | Printing quality | Solvent resistance | Adhesion |
|---|---|---|---|---|---|---|---|
| | | After exposure | Stocker | Standing at normal temp. | | | |
| 2 | 250 | H | 2H | 2H | Good | Good | Good |
| 11 | 500 | HB | F | F | Good | Good | Good |

As shown in above Table 11, although No. 11 ink was capable of exhibiting the same properties as those of No. 2 ink with respect to printing quality, solvent resistance and adhesion, the hardness of the cured ink layer thus obtained was lower than that of No. 2 ink. Further, since the dosage of exposure required in No. 11 ink was larger than that in No. 2 ink so that the sensitivity thereof to light was naturally low. Accordingly, it is inconceivable in view of the results of above Table 11 that the incorporation of propylene carbonate would bring about any especially excellent effect.

Next, various inkjet inks were prepared so as to have the same compositions as those of the aforementioned No. 2 ink and No. 11 ink except that the mixing ratio of the photo-acid generating agent was altered. Then, these inkjet inks were investigated with respect to the curing property of ink, the presence or absence of precipitated solid matters, and delivery performance. The results thus obtained are summarized in the following Table 12. Incidentally, the precipitation of solid matters was visually observed. The delivery performance was evaluated by visually confirming the printed image wherein the printed image which was free from missing of image was defined as "good", and the printed image accompanying several missing portions was defined as "defective".

a result, it was possible to maintain an excellent storage property.

Generally speaking, even though it is possible to improve the curing performance of ink by increasing the content of the photo-acid generating agent, it has been impossible to prevent the deterioration of the storage property of ink. However, it has been confirmed possible to retain stable properties of ink without deteriorating the storage property thereof by the addition of propylene carbonate even if the ink is preserved for a long period of time.

The inkjet ink according to the embodiments of the present invention is required to comprise a vinyl ether compound which is one of acid-polymerizable compounds. By incorporating a predetermined compound as part of the acid-polymerizable compounds into an inkjet ink, it would become possible to provide the inkjet ink with desired properties.

The following Table 13 illustrates the results wherein the properties of the inkjet inks of No. 2 and No. 10 were compared with each other.

TABLE 12

| Ink No. | Content of photo-acid generating agent | Exposure (mJ/cm$^2$) | Pencil hardness after exposure | Precipitation of solid matters | Delivering performance | Shelf life |
|---|---|---|---|---|---|---|
| 2 | 8% | 250 | H | None | Good | Good |
|  | 10% | 250 | H | Yes | Defective | Defective |
|  | 12% | 250 | H | Yes | Defective | Defective |
| 11 | 8% | 500 | HB | None | Good | Good |
|  | 10% | 400 | F | None | Good | Good |
|  | 12% | 300 | H | None | Good | Good |

TABLE 13

| | | Pencil hardness | | | | | |
|---|---|---|---|---|---|---|---|
| Ink No. | Exposure (mJ/cm$^2$) | After exposure | Stocker | Standing at normal temp. | Printing quality | Solvent resistance | Adhesion |
| 2 | 250 | H | 2H | 2H | Good | Good | Good |
| 10 | 250 | 2H | 3H | 3H | Good | Very good | Good |

As shown in above Table 12, in the case of No. 2 ink containing no propylene carbonate, when the content of the photo-acid generating agent became 10% or more, the photo-acid generating agent precipitated as solid matters in the ink even though the curing property was not changed. The inkjet ink having the photo-acid generating agent precipitated therein was very poor in delivery performance.

On the other hand, in the case of No. 11 ink, even if the mixing ratio of the photo-acid generating agent was increased, the precipitation of solid matters was not recognized, and still more, the curing property was improved. As No. 10 inkjet ink was formed of the same composition as that of No. 2 inkjet ink except that 50% by weight of the acid-polymerizable compounds was constituted by an oxetane compound (OXT221). As shown in above Table 13, this oxetane compound was employed together with a vinyl ether compound to enhance the curing hardness. Thus, it was confirmed that the incorporation of an oxetane compound was effective for obtaining a cured ink film more excellent in toughness. Furthermore, since the oxetane compound was also provided with an effect to reduce the volatilization rate of ink, it was also possible to improve the re-delivery performance (delivery performance when the action of delivery is repeated without performing the delivery for a predetermined period of time).

The following Table 14 illustrates the results wherein the properties of the inkjet inks of No. 2 and No. 7 were compared with each other. The plasticity of the ink layer was evaluated by the cracking test of the cured ink layer. Namely, the cured ink layer was quenched from 50° C. down to −50° C. to see if there was any cracking of the ink layer, wherein the ink layer where a very small degree of cracking was visually recognized was defined as "good", and the ink layer where cracking was visually not recognized at all was defined as "very good".

acid-polymerizable compounds was constituted by a diglycidyl ether compound (SR-NPG). As shown in above Table 14, it was possible, through the employment of the oxetane compound together with a vinyl ether compound, to enhance the plasticity and storage property of the cured ink layer without deteriorating the curing hardness at all.

Next, the influence of the structure of the vinyl ether compounds to be incorporated in the ink as an acid-polymerizable compound on the properties of ink was investigated. The following Tables 15 and 16 illustrate the results

TABLE 14

| Ink No. | Exposure (mJ/cm$^2$) | Pencil hardness After exposure | Stocker | Standing at normal temp. | Printing quality | Solvent resistance | Adhesion |
|---|---|---|---|---|---|---|---|
| 2 | 250 | H | 2H | 2H | Good | Good | Good |
| 7 | 300 | F | 2H | 2H | More or less good | Very good | Very good |

No. 7 inkjet ink was formed of the same composition as that of No. 2 inkjet ink except that 50% by weight of the wherein the properties of the inkjet inks of Nos. 1-6 and Nos. 34-58 were compared with each other.

TABLE 15

| Ink No. | Exposure (mJ/cm$^2$) | Pencil hardness After exposure | Stocker | Standing at normal temp. | Printing quality | Solvent resistance | Adhesion |
|---|---|---|---|---|---|---|---|
| 1 | 250 | H | 2H | 2H | Good | Good | Good |
| 2 | 250 | H | 2H | 2H | Good | Good | Good |
| 3 | 250 | H | 2H | 2H | Good | Good | Good |
| 4 | 270 | F | H | H | Good | More or less good | Good |
| 5 | 250 | H | 2H | 2H | Good | Good | Good |
| 6 | 400 | F | H | H | Good | More or less good | Good |
| 34 | 220 | 2H | 3H | 3H | Good | Good | Good |
| 35 | 260 | F | F | H | Good | Good | Good |
| 36 | 230 | F | H | H | Good | Good | Good |
| 37 | 250 | F | H | H | Good | Good | Good |
| 38 | 250 | F | H | H | Good | Good | Good |
| 39 | 250 | F | H | H | Good | Good | Good |
| 40 | 250 | H | 2H | 2H | Good | Good | Good |
| 41 | 250 | H | 2H | 2H | Good | Good | Good |
| 42 | 250 | H | 2H | 2H | Good | Good | Good |
| 43 | 250 | H | 2H | 2H | Good | Good | Good |
| 44 | 280 | F | F | H | Good | Good | Good |
| 45 | 250 | H | 2H | 2H | Good | Good | Good |
| 46 | 260 | F | H | H | Good | Good | Good |
| 47 | 240 | H | 2H | 2H | Good | Good | Good |
| 48 | 250 | F | H | H | Good | Good | Very good |
| 49 | 250 | F | H | H | Good | Good | Very good |
| 50 | 250 | H | H | H | Good | Good | Very good |
| 51 | 250 | H | H | H | Good | Good | Very good |

TABLE 16

| Ink No. | Exposure (mJ/cm$^2$) | Pencil hardness After exposure | Stocker | Standing at normal temp. | Printing quality | Solvent resistance | Adhesion |
|---|---|---|---|---|---|---|---|
| 52 | 300 | F | H | H | Good | More or less good | More or less good |
| 53 | 270 | F | H | H | Good | More or less good | More or less good |

TABLE 16-continued

| | | Pencil hardness | | | | | |
|---|---|---|---|---|---|---|---|
| Ink No. | Exposure (mJ/cm²) | After exposure | Stocker | Standing at normal temp. | Printing quality | Solvent resistance | Adhesion |
| 54 | 280 | F | H | H | Good | More or less good | More or less good |
| 55 | 280 | F | H | H | Good | More or less good | More or less good |
| 56 | 250 | H | 2H | 2H | Good | Good | Good |
| 57 | 300 | F | H | 2H | Good | Good | Good |
| 58 | 250 | H | H | H | Good | Good | Good |

Among the vinyl ether compounds incorporated into these inkjet inks, IBVE(No. 4) and CHMVE(No. 6) were formed of a monovalent vinyl ether compound, and the rest were formed of a bivalent vinyl ether compound. As shown in above Table 15, the inks (Nos. 1-3, No. 5 and Nos. 34-39) containing a bivalent vinyl ether compound were curable with an exposure dosage of as low as several hundreds to several tens mJ/cm² and the pencil hardness of the cured layer was excellent in general. It is assumed that these preferable performance can be obtainable even if vinyl ether compounds having a valency of 2 or more were employed. Accordingly, even if vinyl ether compounds having a valency of 3 or more were employed, it would be possible to enhance the sensitivity of ink to light. In particular, No. 34 ink was very excellent in photosensitive curing property among the inks which were prepared using a single solvent, thus expressing the characteristic performance of ONB-DVE solvent. This excellent photosensitive curing property of No. 34 ink will be clearly recognized even in the comparison thereof with the aforementioned No. 10 ink containing an oxetane compound. As far as the inks which are prepared using a single solvent are concerned, the existence of the ink having such an excellent photosensitivity would be quite rare. Accordingly, it is now possible to prepare an ink having various properties useful of course for printing and also exhibiting advantages in terms of manufacturing cost.

The inks of Nos. 40-43 represent examples of inks which were prepared using solvents into which vinyl ether compounds were incorporated. ISB-DVE and ONB-DVE were formed of a structure comprising an alicyclic skeleton having oxygen atom included therein, and M-CHDV and MEDVE were formed of a structure comprising an alicyclic skeleton having oxygen-containing substituent group included therein. These solvents are characterized in that they provide an excellent hardness of cured film thereof, resulting also in excellent photosensitivity of ink. Additionally, since these solvents were excellent in terms of volatility, it was possible to realize very excellent delivery action and delivery stability.

The inks of Nos. 44-51 represent examples of inks which were prepared by mixing ISB-DVE and ONB-DVE as vinyl ether compounds with a solvent comprising an epoxy compound and an oxetane compound. It will be recognized that in addition to high photo-sensitivity which all of these inks have, No. 44 ink and No. 46 ink were excellent in flexibility of the cured film thereof. It will be recognized that No. 45 ink and No. 47 ink were excellent in curing hardness. Further, it will be recognized that inks of Nos. 48-51 were more excellent in adhesion to recording medium.

The inks of Nos. 52-55 represent examples of inks which were prepared by mixing ONB-DVE with isopropenyl ether compound. It will be recognized that in addition to high photo-sensitivity which all of these inks have, isopropenyl ether compound was relatively low in volatility and hence excellent in stability in delivery of ink. Further, these inks were found excellent in dissolving an acid-generating agent.

The inks of Nos. 56 and 57 represent examples of inks wherein ONB-DVE and a vinyl ether compound having an aromatic ring were employed. These inks were excellent in photosensitive curability, and in dissolving an acid-generating agent. Due to the introduction of an aromatic ring, these inks were enhanced in curability. Further, due to the introduction of methoxy group, the polarity thereof was increased. As a result, these inks were excellent in solubility and volatility, and at the same time, these inks were capable of suppressing the evaporation of the solvent, thus enabling these inks to exhibit more stable deliverability. It was possible, with the employment of these inks, to improve the wettability of ink to a printing medium and hence to obtain a printed matter enhanced in quality of printed images.

Further, CHMVE is a vinyl ether compound having a cyclohexyl skeleton. In the case of an ink comprising a vinyl ether compound (DCPVE) having alicyclic composite cyclic skeleton and linked via a methylene akeleton to vinyl ether group, it is more excellent in photosensitivity as compared with the ink where CHMVE is employed. It was possible to confirm this from the results of the ink of No. 58. As compared with a vinyl ether compound having an alicyclic structure of monocyclic skeleton, a vinyl ether compound having a composite cyclic skeleton was more effective in providing an ink of excellent properties. This trend was admitted also in the cases where a vinyl ether group is not directly linked to an alicyclic skeleton.

Incidentally, in the case of vinyl ether compounds (HQDV, 4CHDV, 1,3CH-DVE and ISB-DVE) which were employed in the inks of Nos. 1-3 and No. 5, the vinyl ether group is directly linked to the cyclic skeleton. The vinyl ether compound (CHMVE) employed in No. 6 ink was provided with a methylene skeleton. It will be recognized from the comparison of them that the ink containing a vinyl ether compound where vinyl ether group is directly linked to a cyclic skeleton is more excellent in photosensitivity as compared with the ink containing a compound having a methylene skeleton. In particular, it is possible in the case of the former ink to enhance the properties such as solvent resistance and adhesion. It was also possible to recognize a trend that as not only the methylene skeleton but also the structure of the linkage portion between the vinyl ether group and the cyclic skeleton became larger, the photosensitivity of ink decreased. It was also confirmed that a vinyl ether compound having vinyl ether group directly linked to a cyclic skeleton was capable of exhibiting very excellent properties.

ISB-DVE and ONB-DVE employed in the inks of No. 5 and No. 34 are compounds having a distorted cyclic ether structure such as oxetane ring or hydrofuran ring. These compounds are considered excellent in reactivity due to their specific structure. In particular, when these cyclic structures are provided with a bridged structure, it is possible to provide the ink with most preferable properties.

Next, the influence of the content of photo-acid generating agent was investigated. An inkjet ink was prepared by following the same procedures as those of No. 2 ink except that the mixing ratio of the photo-acid generating agent was altered as shown in the following Table 17. By using this ink, the performance test thereof was performed using the inkjet recording apparatus 1 shown in FIG. 1. The quantity of exposure, viscosity and the state of delivery of ink on this occasion are summarized in Table 17 together with the mixing ratio of the photo-acid generating agent. The state of delivery of ink was determined from the fluctuation in the state of delivery of ink after the ink was subjected to an accelerated test which was performed for one week under a heated condition of 60° C.

TABLE 17

| | Content of photo-acid generating agent (wt %) | | | | | |
|---|---|---|---|---|---|---|
| | 1 | 2 | 4 | 6 | 8 | 10 |
| Exposure (mJ/cm$^2$) | 800 | 400 | 300 | 250 | 250 | 250 |
| Viscosity (mPa · s) | 10 | 11 | 13 | 15 | 22 | 37 |
| Delivering condition | Good | Good | Good | Good | Barely possible | Impossible |
| Corrosion of Ni | None | None | Trace | Little | Yes | Grate |

As shown in Table 17, when the mixing ratio of the photo-acid generating agent was 1% by weight, it required an exposure dosage of 800 mJ/cm$^2$, thus indicating a low sensitivity of ink. On the other hand, when the mixing ratio of the photo-acid generating agent was increased over 10% by weight, the viscosity of ink gradually increased, resulting in complete failure of delivery. However, when the mixing ratio of the photo-acid generating agent was 2% by weight, it was found possible to retain satisfactory properties of ink such as sufficient curing hardness, solvent resistance, etc., thus confirming that the ink containing the vinyl ether compound was very excellent in photosensitivity.

Above Table 17 also shows the corrosive properties of Ni metal as Ni metal was immersed in each of the inks. Ni metal is generally used in piping or electrodes. Therefore, it is desired that the corrosion of Ni metal by the effect of ink should be avoided as much as possible. The results of above Table 17 clearly shows that when the mixing ratio of the photo-acid generating agent was increased up to 8% by weight or more, the corrosion of Ni metal would become prominent.

In the following Table 18, the relationship between the viscosity of inkjet ink and the delivery performance thereof is summarized. In this case, various inks were prepared by adjusting the composition of No. 8 ink so as to set the viscosity thereof to a predetermined value. Then, the properties of each of the inks were investigated by performing the delivery operation of these inks, the results being illustrated in the following Table 18. Incidentally, the control of temperature was not performed on the occasion of delivering the inks.

TABLE 18

| | Viscosity of ink (mPa · s) | | | | | |
|---|---|---|---|---|---|---|
| | 10 | 11 | 12 | 13 | 14 | 15 |
| Delivering performance without temp. control | Good | Good | Good | More or less good | Defective | Impossible |

Generally, it is required to control the temperature on the occasion of performing the delivering of ink through a head. The results of Table 18 show that as long as the viscosity of ink can be controlled to 12 mPa·s or less, the ink can be delivered or discharged without necessitating such a temperature control, thereby facilitating the designing of head.

Then, the influence of the solubility parameter (SP value) of the epoxy compound was investigated, the results being summarized in the following Table 19. In this case, a plurality of inkjet inks were prepared by following the same procedures as those of No. 12 ink except that an epoxy compound having a predetermined solubility parameter was incorporated in the inks. These inks were investigated with respect to the solubility of the vinyl ether compound, the solubility of the photo-acid generating agent, and the performance of delivery of ink, the results being illustrated in the following Table 19. Incidentally, the solubility was evaluated by visually observing a solution to be obtained as predetermined acid-polymerizable compounds and photo-acid generating agents were mixed therein, wherein a solution which is completely free from turbidity and precipitates was defined as "good", and a solution accompanying turbidity or containing a little amount of precipitates was defined as "slightly defective". A solution exhibiting an intermediate state between "good" and "slightly defective" was defined as "more or less good".

TABLE 19

| | SP value (Mpa$^{1/2}$) | | | | | |
|---|---|---|---|---|---|---|
| | 17 | 18 | 19 | 20 | 21 | 22 |
| Solubility of vinyl ether | Good | Good | Good | Good | Good | Good |
| Solubility of photo-acid generating agent | Poor | More or less good | Good | Good | Good | Good |
| Delivering performance | Impossible | More or less good | Good | Good | Good | Good |

As shown in Table 19, the inks containing an epoxy compound exhibiting a solubility parameter of 19 MPa$^{1/2}$ or more were found capable of easily dissolving the vinyl ether compound and the photo-acid generating agent. Whereas, in the case of the inks exhibiting a solubility parameter of less than 19 MPa$^{1/2}$, the photo-acid generating agent precipitated as solid matters and to remain in the inks as impurities. Since these impurities would badly affect the quality of ink, such as deterioration of ink-delivering performance, deterioration of photosensitivity of ink, and deterioration of filtering conditions in the process of manufacturing the ink, it is desirable to minimize these impurities as much as possible.

Further, the influence of viscosity of the epoxy compound on the ink was investigated, the results being summarized in the following Table 20. In this case, a plurality of inkjet inks were prepared by following the same procedures as those of No. 13 ink except that an epoxy compound having a predetermined viscosity was incorporated in the inks. These inks were investigated with respect to the viscosity and the delivery performance thereof, the results being illustrated in the following Table 20. Incidentally, the following Table 21 shows the results of the inks which were prepared by incorporating a low viscosity epoxy compound into the inks in place of the vinyl ether compound.

TABLE 20

| | Viscosity of epoxy compound (mPa · s) | | | |
|---|---|---|---|---|
| | 100 | 500 | 1000 | 10000 |
| Viscosity of ink (mPa · s) | 10 | 15 | 35 | 45 |
| Delivering performance | Good | Good | Good | Good |
| Glossiness | Poor | Good | Good | Good |

TABLE 21

| | Viscosity of epoxy compound (mPa · s) | | | |
|---|---|---|---|---|
| | 100 | 500 | 1000 | 10000 |
| Viscosity of ink with epoxy compound (mPa · s) | 20 | 55 | 70 | 120 |
| Delivering performance | Good | Poor | Impossible | Impossible |

As shown in Tables 20 and 21, it was possible, due to the employment of the vinyl ether compound, to obtain inks which were not only excellent in compatibility to an acid-polymerizable compound of high viscosity but also low in viscosity. Moreover, the delivery performance was also excellent in all of the inks thus obtained. Since it was possible to incorporate an acid-polymerizable compound of high viscosity into these inks, the cured ink layer was enabled to have a glossy surface, and at the same time, the ink layer was enhanced in flexibility. Whereas, in the case of the inks into which an epoxy resin of low viscosity was incorporated, it was difficult to sufficiently lower the viscosity of ink to such an extent that makes the ink meet suitable delivery conditions, and the photosensitivity of the inks was also poor.

Solvents A2, A7 and A10 were respectively mixed with other components according to the recipe shown in the following Table 22 to prepare various inkjet inks.

TABLE 22

| Solvents No. (wt %) | Pigments (wt %) | Photo-acid generating agent(wt %) | Viscosity-stabilizing agent(tw %) | Ink No. |
|---|---|---|---|---|
| A2(78.7) | BL(5%) | PAG5(8) | BS1(8.3) | 16 |
| A2(78.7) | BL(5%) | PAG5(8) | BS2(8.3) | 17 |
| A2(78.7) | BL(5%) | PAG5(8) | BS3(8.3) | 18 |
| A2(78.7) | BL(5%) | PAG5(8) | BS4(8.3) | 19 |
| A2(78.7) | BL(5%) | PAG5(8) | BS5(8.3) | 20 |
| A2(78.7) | BL(5%) | PAG5(8) | BS6(8.3) | 21 |
| A2(78.7) | BL(5%) | PAG5(8) | BS7(8.3) | 22 |
| A7(78.7) | BL(5%) | PAG5(8) | BS3(8.3) | 23 |
| A10(78.7) | BL(5%) | PAG5(8) | BS3(8.3) | 24 |
| A2(78.7) | Y(5%) | PAG5(8) | BS5(8.3) | 25 |
| A2(78.7) | M(5%) | PAG5(8) | BS5(8.3) | 26 |
| A2(78.7) | C(5%) | PAG5(8) | BS5(8.3) | 27 |
| A7(78.7) | BL(5%) | PAG1(8) | BS7(8.3) | 28 |
| A7(78.7) | BL(5%) | PAG2(8) | BS7(8.3) | 29 |
| A7(78.7) | BL(5%) | PAG3(8) | BS7(8.3) | 30 |

TABLE 22-continued

| Solvents No. (wt %) | Pigments (wt %) | Photo-acid generating agent(wt %) | Viscosity-stabilizing agent(tw %) | Ink No. |
|---|---|---|---|---|
| A7(78.7) | BL(5%) | PAG4(8) | BS7(8.3) | 31 |
| A2(92) | | PAG5(8) | | 32 |

Carbon black, C.I. Pigment Yellow 180, C.I. Pigment Blue 15 and C.I. Pigment Red 123 were employed for the preparation of black pigment (BK), yellow pigment (Y), cyan pigment (C) and magenta pigment (M), respectively.

Specific examples of the compounds employed as a photo-acid generating agent are shown below.

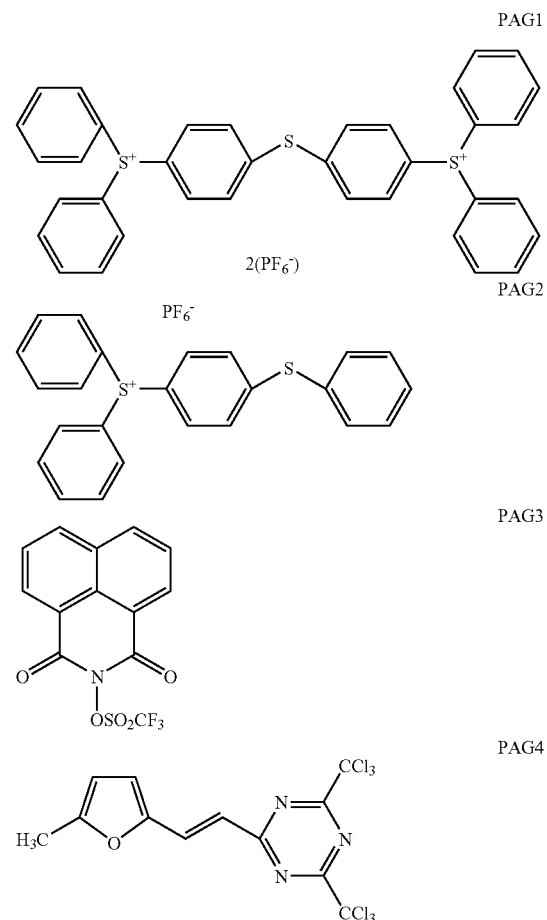

Incidentally, PAG5 is a 50% propylene carbonate solution of a mixture of PAG1 and PAG2.

Further, specific examples of the compounds (BS1-BS7) incorporated into the inks as a viscosity-stabilizing agent are shown by the chemical formulas thereof.

These compounds were added to the inks by mol % based on net photo-acid generating agent (for example, in the case of combination of BS and PAG5, it would be 8.3 mol % corresponding to about 1 wt %).

BS1

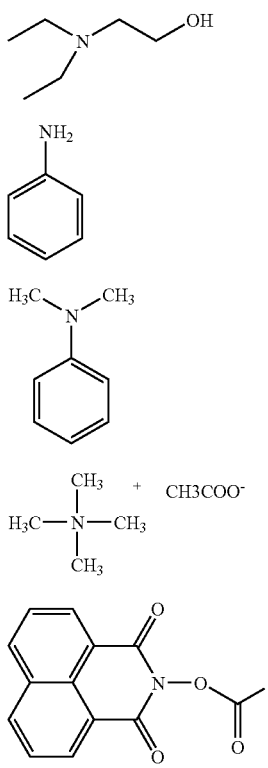

BS2

BS3

BS4

BS5

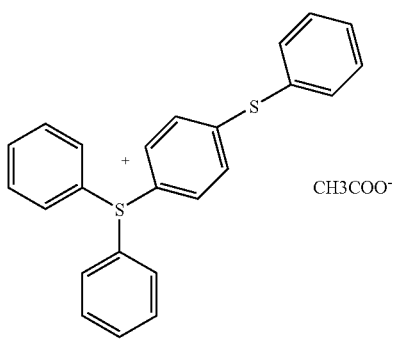

BS7

In the preparation of the inks, each pigment was kneaded together with acrylic resin-based dispersing agent in advance to prepare a mill base, to which 200 ppm of a nonionic surfactant (Sumitomo 3M Co., Ltd.) and a dispersing agent available in the market (Ajisper trade name; Ajinomoto Fine Techno Co., Ltd.) were added to obtain a mixture. Further, according to the recipe shown in above Table 20, a pigment, a photo-acid generating agent and a viscosity-stabilizing agent were added to the mixture and then subjected to dispersion treatment a whole day and night by using a paint shaker. The resultant mixture that had been subjected to this dispersion treatment was filtered by using a 5 μm PTFE filter to obtain inkjet inks (Nos. 16-31).

Meanwhile, the same procedures as described above were repeated except that the pigment and the viscosity-stabilizing agent were not incorporated therein to obtain No. 32 ink. Likewise, the same procedures as described above were repeated except that the viscosity-stabilizing agent was not incorporated therein to obtain No. 2 ink.

The inks prepared in this manner were left to stand for 6 months at the ordinary temperature to measure the viscosity thereof, and based on the ratio of increase of viscosity, the shelf life of the inks was evaluated, the results being summarized in the following Table 23. In the determination of the ratio of increase of viscosity, the inks were left to stand for 6 months at the ordinary temperature, and the viscosity of the inks before and after this standing was measured to determine the ratio of increase of viscosity. The ratio of increase of viscosity was evaluated according to the following criterion.

TABLE 23

| Ink No. | Shelf life |
|---|---|
| 16 | A |
| 17 | A |
| 18 | A |
| 19 | A |
| 20 | A |
| 21 | A |
| 22 | A |
| 23 | A |
| 24 | A |
| 25 | A |
| 26 | A |
| 27 | A |
| 28 | A |
| 29 | A |
| 30 | A |
| 31 | A |
| 32 | B |
| 2 | C |

A: 10% or less
B: 10 to 20%
C: 20% or more

As shown in Table 23, in the case of the inks Nos. 32 and 2, the ratio of increase of viscosity was higher than 10%. It will be seen from these results that if a viscosity-stabilizing agent is not included in the ink (inks Nos. 32 and 2), the ratio of increase of viscosity would become higher.

Next, by applying each of the inks that had been left to stand for 6 months under the aforementioned conditions to the inkjet recording apparatus shown in FIG. 1, the quantity of exposure and the hardness of the cured ink layer were investigated. As for the recording medium 2, the ordinary enameled paper was employed. As for the light source 5, an ultra-high pressure mercury lamp having an output of 230 W was employed. With respect to the properties of the inks, the pencil hardness of the ink layer (the hardness of the ink layer that had been kept in a stocker for 3 minutes at a temperature of 80° C. after finishing the exposure) and the quality of printing were measured. In the same manner, the properties of the inks of the initial state thereof before the storage were investigated, the results being illustrated in the following Table 24 together with the quantity of exposure.

TABLE 24

| | Initial time | | After 6 month | | |
|---|---|---|---|---|---|
| Ink No. | Exposure (mJ/cm$^2$) | Pencil hardness | Exposure (mJ/cm$^2$) | Pencil hardness | Printing quality |
| 16 | 300 | H | 300 | H | Good |
| 17 | 300 | H | 300 | H | Good |
| 18 | 300 | H | 300 | H | Good |
| 19 | 300 | H | 300 | H | Good |
| 20 | 300 | H | 300 | H | Good |
| 21 | 300 | H | 300 | H | Good |
| 22 | 300 | H | 300 | H | Good |
| 23 | 300 | H | 300 | H | Good |

TABLE 24-continued

| Ink No. | Initial time | | After 6 month | | Printing quality |
|---|---|---|---|---|---|
| | Exposure (mJ/cm²) | Pencil hardness | Exposure (mJ/cm²) | Pencil hardness | |
| 24 | 300 | H | 300 | H | Good |
| 25 | 300 | H | 300 | H | Good |
| 26 | 300 | H | 300 | H | Good |
| 27 | 300 | H | 300 | H | Good |
| 28 | 300 | H | 300 | H | Good |
| 29 | 300 | H | 300 | H | Good |
| 30 | 300 | H | 300 | H | Good |
| 31 | 300 | H | 300 | H | Good |
| 32 | 250 | 2H | — | — | Impossible |

As shown in Table 24, in the case of the ink No. 2, the viscosity thereof greatly increased after it was left to stand for 6 months, thus making it impossible to perform the delivery thereof. Whereas, in the case of the inks Nos. 16-31 each containing a basic compound or a basicity-generating compound as a viscosity-stabilizing agent, they were capable of being delivered in an excellent manner even after the standing thereof for 6 months, thus indicating remarkably enhanced stabilization of viscosity.

When investigations were performed on the corrosive property of these inks to Ni metal to be employed for the manufacture the piping or head member of recording apparatus, the corrosion of these members was not recognized at all. On the other hand, in the case of the inks Nos. 32 and 2 where the viscosity-stabilizing agent was not included therein, some degree of corrosion was recognized, thus confirming that the viscosity-stabilizing agent was capable of functioning as an anti-corrosion agent.

Next, a plurality of inkjet inks having the same composition as that of No. 23 ink except that the mixing ratio (mol % based on the photo-acid generating agent) of the basic compound BS3 (i.e. a viscosity-stabilizing agent) was varied were prepared. These inks were then measured with respect to the pencil hardness and the ratio of increase of viscosity after 6 months, the results obtained are shown in the following Table 25 together with the ratio of the compound BS3.

TABLE 25

| | Ratio of BS3 (molar ratio) | | | | | | | | |
|---|---|---|---|---|---|---|---|---|---|
| | 1 | 2 | 7 | 15 | 30 | 50 | 70 | 75 | 100 |
| Pencil hardness | H | H | F | F | B | <2B | — | — | — |
| Shelf life | C | C | B | B | A | A | A | A | A |

As shown in Table 25, when the viscosity-stabilizing agent was incorporated at a ratio of 1 mol % based on the quantity of the photo-acid generating agent, the effect of the viscosity-stabilizing agent to stabilize the viscosity was not recognized in any substantial degree. On the other hand, the viscosity-stabilizing agent was incorporated at an excessive ratio of over 30 mol %, the curing property of ink deteriorated. It will be seen from these results that the mixing ratio of the viscosity-stabilizing agent should preferably be confined within the range of 1 to 30 mol % based on the quantity of the photo-acid generating agent.

Furthermore, the influence of pKb of the basic compounds was investigated. In this case, a plurality of inkjet inks were prepared in the same manner as No. 16 ink except that the pKb of the basic compound to be employed was altered as shown in the following Table 26. These inks were investigated with respect to the shelf life and photosensitivity, the results being illustrated in Table 26.

TABLE 26

| | PKb | | | | | | | |
|---|---|---|---|---|---|---|---|---|
| | 2 | 3 | 4 | 5 | 6 | 7 | 8 | 9 |
| Shelf life | A | A | A | A | A | A | B | C |
| Photosensitivity | B | A | A | A | A | A | A | A |

The inks were individually left to stand for 6 months at the ordinary temperature, and the viscosity of the inks before and after this standing was measured to determine the ratio of increase of viscosity, from which the ratio of increase of viscosity was evaluated according to the following criterion.

A: 10% or less
B: 10 to 20%
C: 20% or more

The photosensitivity was investigated by measuring the quantity of exposure required for enabling the cured ink layer to exhibit a pencil hardness of H and then the photosensitivity was evaluated according to the following criterion.

A: It was possible to reach a pencil hardness of H with the quantity of exposure being less than 300 mJ/cm².

B: It was possible to reach a pencil hardness of H with the quantity of exposure being 300 mJ/cm² or more.

As shown in above Table 26, it will be recognized that when a basic compound having a pKb value ranging from 3 to 7 is added to an inkjet ink, it is possible to obtain an inkjet ink which is excellent in not only shelf life but also in photosensitivity.

As explained above, according to one aspect of the present invention, it is possible to provide an inkjet ink without necessitating not only the employment of an organic solvent but also an exposure system of large scale for obtaining printed matters of high quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inkjet ink comprising:
a photo-acid generating agent which is capable of generating an acid as it is irradiated with light;
a color component; and
an acid-polymerizable compound which can be polymerized in the presence of an acid;
wherein the acid-polymerizable compound comprises a compound represented by the following formula 1:

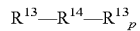

$$R^{13}-R^{14}-R^{13}{}_{p} \qquad 1$$

wherein $R^{13}$ is a group selected from a group consisting of a vinyl ether moiety, an atomic group having a vinyl ether moiety, an alkoxy moiety, an ether moiety, an ester moiety, and a hydroxyl moiety, wherein at least two of $R^{13}$ are selected from a vinyl ether moiety or an atomic group having a vinyl ether moiety; $R^{14}$ is an atomic group comprising a substituted or unsubstituted cyclic skeleton containing an oxygen atom as a ring-constituting atom and having a valence of p+1; and p is a positive integer, and wherein the cyclic skeleton is one represented by VE2-a or VE2-b:

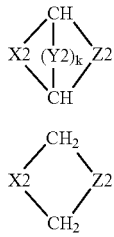

VE2-a

VE2-b wherein at least one of X2, Y2 and Z2 contains at least one oxygen atom; X2 and Z2 are respectively an alkylene group having 1 to 5 carbon atoms or a bivalent organic group containing an oxygen atom as an ether linkage; Y2 is an oxygen atom, an alkylene group having 1 to 2 carbon atoms, or a bivalent organic group containing an oxygen atom as an ether linkage; and k is 0 or 1.

2. The inkjet ink according to claim 1, wherein at least one of $R^{13}$ in the compound represented by formula 1 is a vinyl ether moiety which is directly linked to the cyclic skeleton.

3. The inkjet ink according to claim 1, wherein the compound represented by formula 1 is selected from the compounds represented by the following chemical formulas:

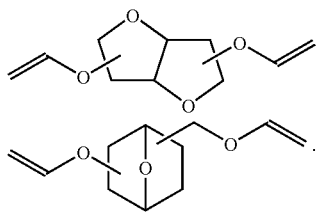

4. The inkjet ink according to claim 1, wherein the acid-polymerizable compound further includes at least one compound selected from the group consisting of cyclic carbonate and cyclic lactone compound.

5. The inkjet ink according to claim 1, wherein the acid-polymerizable compound further includes an oxetane compound.

6. The inkjet ink according to claim 1, wherein the acid-polymerizable compound further includes diglycidyl ether of neopentylglycol.

7. The inkjet ink according to claim 1, further comprises at least one compound selected from the group consisting of a basic compound and a compound expressing basicity and exhibiting a pKb ranging from 3 to 7 at a temperature of 25° C.

8. An inkjet ink comprising:
a photo-acid generating agent which is capable of generating an acid as it is irradiated with light;
a color component; and
an acid-polymerizable compound which can be polymerized in the presence of an acid;

wherein at least 40% of the acid-polymerizable compound is a compound represented by the following formula 1, and the viscosity of said ink is not higher than 12 mPa·sec at 25° C.:

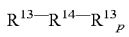

1 wherein $R^{13}$ is selected from a group consisting of a vinyl ether moiety, an atomic group having a vinyl ether moiety, an alkoxy moiety, an ether moiety, an ester moiety, and a hydroxyl moiety wherein at least two of $R^{13}$ are selected from a vinyl ether moiety or an atomic group having a vinyl ether moiety; $R^{14}$ is an atomic group comprising a substituted or unsubstituted cyclic skeleton containing an oxygen atom as a ring-constituting atom and having a valence of p+1; and p is a positive integer, and wherein the cyclic skeleton is one represented by VE2-a or VE2-b:

VE2-a

VE2-b wherein at least one of X2, Y2 and Z2 contains at least one oxygen atom; X2 and Z2 are respectively an alkylene group having 1 to 5 carbon atoms or a bivalent organic group containing an oxygen atom as an ether linkage; Y2 is an oxygen atom, alkylene group having 1 to 2 carbon atoms, or a bivalent organic group containing an oxygen atom as an ether linkage; and k is 0 or 1.

9. The inkjet ink according to claim 8, further comprising at least one compound selected from a group consisting of a basic compound and a compound expressing basicity and exhibiting a pKb ranging from 3 to 7 at a temperature of 25° C.

10. An inkjet ink comprising:
a photo-acid generating agent which is capable of generating an acid as it is irradiated with light;
a color component; and
an acid-polymerizable compound which can be polymerized in the presence of an acid;
wherein at least 40% of the acid-polymerizable compound is a compound represented by the following formula 1, and said ink further comprising an epoxy compound and/or oxetane compound each having a solubility parameter of 19 MPa$^{1/2}$ or more:

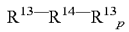

1 wherein $R^{13}$ is selected from a group consisting of a vinyl ether moiety, an atomic group having a vinyl ether moiety, an alkoxy moiety, an ether moiety, an ester moiety, and a hydroxyl moiety, wherein at least two of $R^{13}$ are selected from a vinyl ether moiety or an atomic group having a vinyl ether moiety; $R^{14}$ is an atomic group comprising a substituted or unsubstituted cyclic skeleton containing an oxygen atom as a ring-constituting atom and having a valence of p+1; and p is a positive integer, and wherein the cyclic skeleton is one represented by VE2-a or VE2-b:

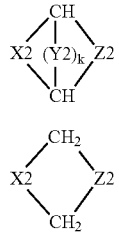

VE2-a

VE2-b wherein at least one of X2, Y2 and Z2 contains at least one oxygen atom; X2 and Z2 are respectively an alkylene group having 1 to 5 carbon atoms or a bivalent organic group containing an oxygen atom as an ether linkage; Y2 is an oxygen atom, alkylene group having 1 to 2 carbon atoms, or a bivalent organic group containing an oxygen atom as an ether linkage; and k is 0 or 1.

11. The inkjet ink according to claim 10, further comprising at least one compound selected from a group consisting of a basic compound and a compound expressing basicity and exhibiting a pKb ranging from 3 to 7 at a temperature of 25° C.

* * * * *